United States Patent
Ligameri et al.

(10) Patent No.: US 10,775,995 B2
(45) Date of Patent: Sep. 15, 2020

(54) DEFINING A ZONE TO PERFORM AN ACTION IN A DUAL-SCREEN TABLET

(71) Applicant: Dell Products L. P., Round Rock, TX (US)

(72) Inventors: Mark R. Ligameri, Santa Rosa, FL (US); David O. Garner, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/508,957

(22) Filed: Jul. 11, 2019

(65) Prior Publication Data

US 2019/0332239 A1    Oct. 31, 2019

Related U.S. Application Data

(63) Continuation of application No. 15/801,948, filed on Nov. 2, 2017, now Pat. No. 10,423,321.

(51) Int. Cl.
*G06F 17/00*    (2019.01)
*G06F 3/0486*   (2013.01)
(Continued)

(52) U.S. Cl.
CPC ........ *G06F 3/0486* (2013.01); *G06F 3/04845* (2013.01); *G06F 3/04883* (2013.01);
(Continued)

(58) Field of Classification Search
CPC .. G06F 3/0486; G06F 3/1446; G06F 3/04883; G06F 3/04845; G06F 3/04886;
(Continued)

(56) References Cited

U.S. PATENT DOCUMENTS 5,819,055 A    10/1998   MacLean et al.
7,891,900 B2 *  2/2011   Clarke ............... A46B 11/0017
                                                401/268
(Continued)

OTHER PUBLICATIONS

Ries, Laurie Anne, U.S. Patent and Trademark Office, Non-Final Office Action dated Jan. 17, 2019 for U.S. Appl. No. 15/801,948, 13 pages.
(Continued)

*Primary Examiner* — Laurie A Ries
(74) *Attorney, Agent, or Firm* — Campbell Stephenson LLP; Shiv S. Naimpally

(57) ABSTRACT

In some implementations a computing device may comprise a first and a second display device. A zone may be defined on the first display device. The computing device may receive selection input selecting an object and receive directional input to move the object on the first display device. After determining that a location of the object is within a predetermined distance from (or within) a boundary of the zone, a message indicating an action associated with the zone may be displayed. After determining that at least a portion of the object is within the boundary of the zone, the action may be performed. The action may include moving the object to the second display device, opening (e.g., maximizing) a window associated with the object to span both the first and second display device, or storing the object in the zone for subsequent retrieval on the second display device.

20 Claims, 15 Drawing Sheets

(51) Int. Cl.
*G06F 3/14* (2006.01)
*G09G 5/14* (2006.01)
*G06F 3/0488* (2013.01)
*G06F 3/0484* (2013.01)

(52) U.S. Cl.
CPC ............ *G06F 3/1446* (2013.01); *G09G 5/14* (2013.01); *G09G 2340/0464* (2013.01); *G09G 2354/00* (2013.01)

(58) Field of Classification Search
CPC ........... G06F 3/0483; G06F 2200/1614; G06F 1/1694; G06F 1/1647; G06F 1/1641; G09G 5/14; G09G 2340/0464; G09G 2354/00
See application file for complete search history.

(56) References Cited

U.S. PATENT DOCUMENTS

| | | | |
|---|---|---|---|
| 8,749,484 B2* | 6/2014 | de Paz | G06F 3/1423 345/156 |
| 8,791,900 B2 | 7/2014 | Harris et al. | |
| 9,047,244 B1 | 6/2015 | Puppin | |
| 9,218,021 B2 | 12/2015 | Sirpal et al. | |
| 9,454,304 B2* | 9/2016 | Hinckley | G06F 3/041 |
| 9,595,186 B2 | 3/2017 | Kim | |
| 9,727,205 B2 | 8/2017 | Freedman | |
| 9,729,635 B2* | 8/2017 | Zhou | G06F 3/0488 |
| 2008/0115064 A1 | 5/2008 | Roach et al. | |
| 2010/0241994 A1 | 9/2010 | Wiley et al. | |
| 2011/0066971 A1 | 3/2011 | Forutanpour et al. | |
| 2011/0175920 A1 | 7/2011 | Ieperen | |
| 2012/0117487 A1 | 5/2012 | Lotan et al. | |
| 2012/0254793 A1 | 10/2012 | Briand et al. | |
| 2013/0145295 A1 | 6/2013 | Booking et al. | |
| 2013/0332872 A1 | 12/2013 | Grinberg | |
| 2014/0195898 A1 | 7/2014 | Vertegaal et al. | |
| 2014/0249443 A1 | 9/2014 | Banet et al. | |
| 2015/0126175 A1 | 5/2015 | Fok et al. | |
| 2015/0169208 A1 | 6/2015 | Cho et al. | |
| 2015/0180912 A1 | 6/2015 | Dufour | |
| 2016/0004380 A1 | 1/2016 | Kim et al. | |
| 2016/0196048 A1* | 7/2016 | Khoury | H04N 21/4312 715/761 |
| 2017/0004484 A1 | 1/2017 | Seol et al. | |
| 2017/0192733 A1 | 7/2017 | Huang et al. | |
| 2017/0345396 A1 | 11/2017 | Yu et al. | |
| 2018/0113666 A1* | 4/2018 | Knepper | G06F 1/1677 |
| 2018/0129362 A1 | 5/2018 | Sirpal et al. | |

OTHER PUBLICATIONS

Ries, Laurie Anne, U.S. Patent and Trademark Office, Non-Final Office Action dated Apr. 9, 2019 for U.S. Appl. No. 15/801,948, 17 pages.

\* cited by examiner

BOOK ORIENTATION 302

VERTICAL TABLET ORIENTATION 304

DEFINING A ZONE TO PERFORM AN ACTION IN A DUAL-SCREEN TABLET

BACKGROUND OF THE INVENTION

Field of the Invention

This invention relates generally to dual-display devices and, more particularly, to defining and using zones on portions of either or both displays of a dual-display device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, operating systems have assumed the presence of a single display device. Over time, operating systems have been updated to provide rudimentary support for an additional display device. However, the operating system merely treats both devices as a single device and ignores the fact that each display device has a bezel and that there may be a gap between the two display devices. Such problems may be more exacerbated in a small form factor computing device, such as a phone or tablet, that has two built-in display devices.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations a computing device may comprise a first and a second display device. A zone may be defined on the first display device. The computing device may receive selection input selecting an object and receive directional input to move the object on the first display device. After determining that a location of the object is within a predetermined distance from (or within) a boundary of the zone, a message indicating an action associated with the zone may be displayed. After determining that at least a portion of the object is within the boundary of the zone, the action may be performed. The action may include moving the object to the second display device, opening (e.g., maximizing) a window associated with the object to span both the first and second display device, or storing the object in the zone for subsequent retrieval on the second display device.

BRIEF DESCRIPTION OF THE DRAWINGS

A more complete understanding of the present disclosure may be obtained by reference to the following Detailed Description when taken in conjunction with the accompanying Drawings. In the FIG.s, the left-most digit(s) of a reference number identifies the FIG. in which the reference number first appears. The same reference numbers in different FIG.s indicate similar or identical items.

DETAILED DESCRIPTION

Figure 1:
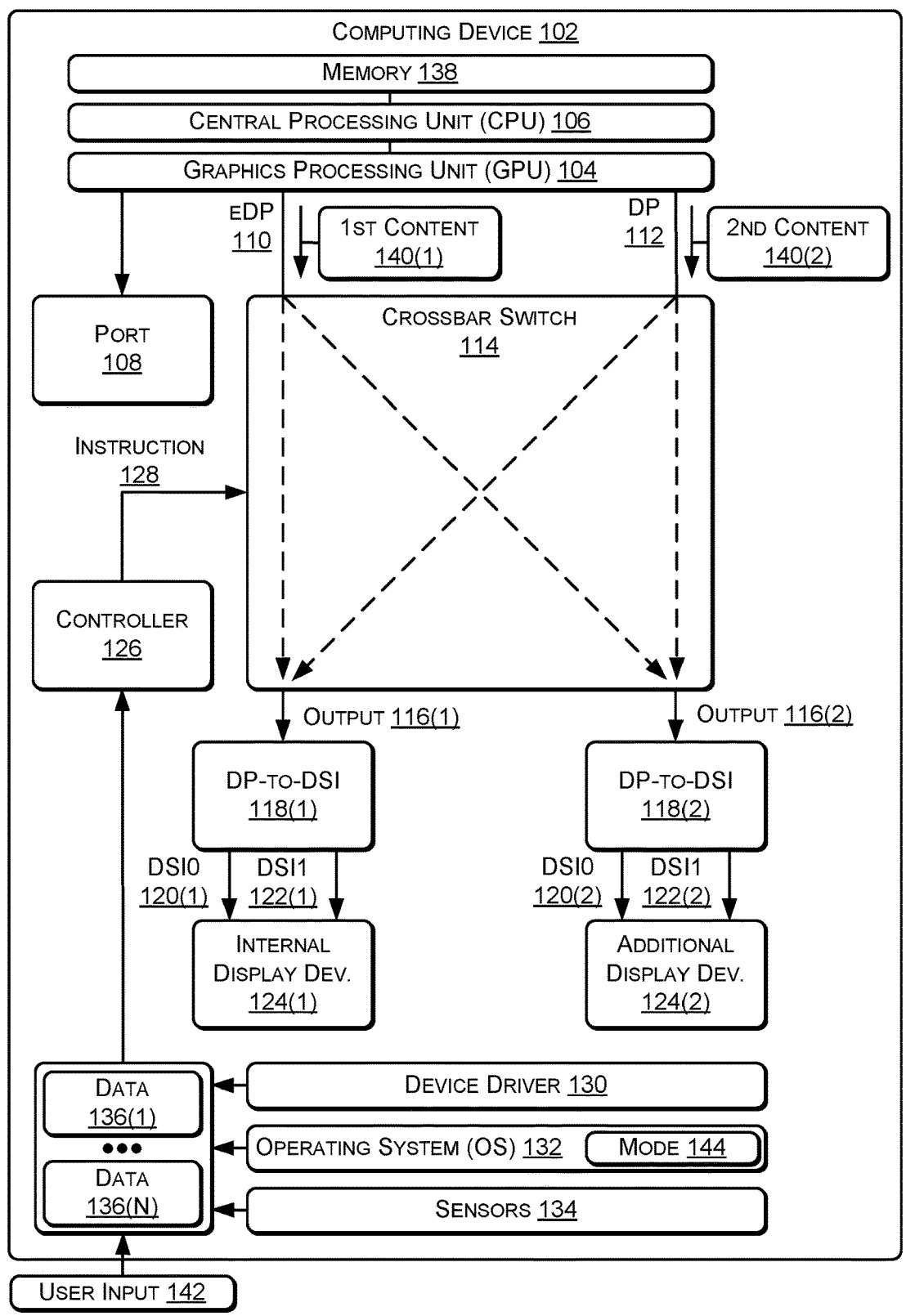
FIG. 1 is a block diagram of an architecture of a computing device that includes a crossbar switch according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may define one or more zones on a computing device with at least two display devices, with each zone having an associated action. For example, a computing device may include: a first display device, a second display device, one or more processors, and one or more non-transitory computer readable media storing instructions executable by the one or more processors to perform various operations. The operations may include defining a first zone on the first display device. The first zone may be defined on the first display device by creating the zone with a pre-specified length and a pre-specified width and positioning the zone at a pre-specified location on the first display device. The computing device may receive selection input selecting an object being displayed on the first display device and receive directional input to move the object on the first display device. The object may include at least one of a file, an application, or a folder. After determining that a location of the object is within a predetermined distance from a boundary of the zone, the computing device may display (one either the first display device or the second display device), for a predetermined period of time, a message indicating an action associated with the zone. After the predetermined period of time has elapsed, the computing device may determine whether at least a portion of the object is within the boundary of the zone. If the computing device determines that at least a portion of the object is within the boundary of the zone, the computing device may perform the action associated with the zone to (or using) the object. For example, the action associated with the zone may include displaying the object on the second display device and stopping displaying the object on the first display device. As another example, the action associated with the zone may include opening (e.g., maximizing) a window associated with the object to span both the first display device and the second display device. As yet another example, the action associated with the zone may include displaying a first portion of the object within the first zone on the first display device and displaying a second portion of the object within a second zone on the second display device. In this example, the computing device may receive second selection input selecting the second portion of the object within the second zone on the second display device, receive second directional input to move the object, causing the computing device to display the object outside the second zone, on the second display device.

FIG. 1 is a block diagram of an architecture 100 of a computing device that includes a crossbar switch according to some embodiments. The computing device 102 includes a graphics processing unit 104. The graphics processing unit 104 may be an independent device (e.g., integrated circuit) or may be part of a central processing unit 106. The GPU 104 may provide three video data outputs (e.g., three pipes). For example, a third video data output of the GPU 104 may be sent to a port 108. The port 108 may be used to connect an external display device to the computing device 102. In some implementations, the third video data output of the GPU 104 may be sent to a third display device of the computing device 102 (e.g., instead of to the port 108). The GPU 104 may provide a second video data output from an embedded DisplayPort (eDP) port 110. The GPU 104 may provide a third video data output from a DisplayPort (DP) port 112. First content 140(1) from the eDP 110 and second content 140(2) from the DP 112 may be sent to a crossbar switch 114. The crossbar switch 114 may be capable of routing the content 140 from the eDP 110 and the output from the DP 112 to either (or both) output 116(1) or output 116(2). The outputs 116 from the crossbar switch 114 may be sent to a DP-to-DSI converter 118. The DP-to-DSI converter 118 may convert a DisplayPort compliant signal into a display serial interface (DSI) compliant signal. For example, the DP-to-DSI 118(1) may provide two DSI lanes DSI0 120(1) and DSI1 122(1) to an internal display device 124(1). The internal display device 124(1) is a display device that is typically (e.g., in a computing device with a single display) connected to the eDP port 110. The DP-to-DSI 118(2) may receive the output 116(2) from the crossbar switch 114 and provide two DSI lanes DSI0 120(2) and DSI1 122(2) to the additional display device 124(2).

A controller 126 (e.g., an embedded controller) may receive data 136(1) to data 136(N) (where N>0) from one or more of (i) a device driver 130 (e.g., associated with GPU 104), (ii) an operating system 132 of the computing device 102, (iii) one or more sensors 134 associated with the computing device 102, or (iv) user input 142 provided by a user of the computing device 102. For example, the sensors 134 may include an accelerometer, a gyroscope, a magnetometer or a magnetic compass, a proximity sensor, a camera, another type of sensor, or any combination thereof. A user of the computing device 102 may provide the user input 142. In some cases, the user input 142 may override the data from one or more of the device driver 130, the operating system 132, or the sensors 134. For example, the controller 126 may use the data from one or more of the device driver 130, the operating system 132, or the sensors 134 to determine a particular routing and instruct the crossbar switch 114 to configure a particular routing. In some cases, the user may override the particular routing by providing the user input 142.

The computing device 102 may include a memory 138. The memory 138 may be used to store content, such as the first content 140(1) and the second content 140(2). At least one of the first content 140(1) or the second content 140(2) may include unprotected content or protected content (e.g., content protected using a DRM scheme).

The controller 126 may, based on the data 136, provide an instruction 128 to the crossbar switch 114 to select a routing that routes one or more of the first content 140(1) (from the eDP port 110) or the second content 140(2) (from the DP port 112) to one or more of the outputs 116(1) or 116(2). For example, the crossbar switch 114 may route the first content 140(1) from the eDP port 110 to the output 116(1) for display on the internal display device 124(1) and may route the second content 140(2) from the DP port 112 to the output 116(2) for display on the additional display device 124(2). As a second example, the crossbar switch 114 may route the first content 140(1) from the eDP port 110 to the output 116(2) for display on the additional display device 124(2) and may route the second content 140(2) from the DP port 112 to the output 116(1) for display on the internal display device 124(2). As a third example, the crossbar switch 114 may route the first content 140(1) from the eDP port 110 to both the output 116(1) and 116(2) for display on the internal display device 124(1) and the additional display device 124(2). As a fourth example, the crossbar switch 114 may route the second content 140(2) from the DP port 112 to both the output 116(1) and the output 116(2) for display on the internal display device 124(1) and the additional display device 124(2).

The controller 126 may determine which routing of the crossbar switch 114 to select based on (1) an orientation of the computing device 102, (2) a display mode 144 of the operating system 132, and (3) whether DRM-protected content is being displayed. The orientation of the computing device 102 may be determined based on which of the display devices 124(1) or 124(2) is "up" (when the computing device 102 is in a horizontal orientation) or which of the display devices 124(1) or 124(2) is "left" (when the computing device 102 is in a vertical orientation). For example, the operating system 132, such as Microsoft® Windows®, may provide three display modes 144: (a) extended desktop mode where the display devices 124(1) and 124(2) behave as if they were a single display device, (b) clone mode where each of the display devices 124(1) and 124(2) display the same content, or (c) single display mode, e.g., one of the display devices 124(1) or 124(2) is off and therefore not displaying any content. For example, single display mode may be used when the computing device is in a tablet orientation to turn off a particular display device (of the display devices 124(1) and 124(2)) that is not visible to (or facing) the user.

The operating system (OS) 132 may allow DRM protected content to be displayed on a single display device (e.g., either 124(1) or 124(2)) and prevent DRM protected content from being displayed across both of the displays in extended desktop mode (because in extended desktop mode, one of the display devices 124(1) or 124(2) is to be driven by output from the DP port 112). Therefore, DRM protected content may be displayed on only one of the display devices 124(1) or 124(2) in the extended desktop mode. Thus, in all three of the modes 144 (e.g., extended desktop mode, clone mode, or single display mode), the DRM protected content may be displayed on either the internal display device 124(1) or the additional display device 124(2) depending on which of the display devices 124(1) and 124(2) is visible to the user (e.g., based on the orientation of the computing device 102).

Typically, when viewing DRM protected content such as a movie or television show, the computing device may be in a horizontal (e.g., landscape) orientation. In any of the three display modes, if the internal display device 124(1) is "up" in the horizontal orientation, then the first content 140(1) from the eDP port 110 may be sent to the output 116(1) for display on the internal display device 124(1). In any of the three display modes, if the additional display device 124(2) is "up" in the horizontal orientation, then the first content 140(1) from the eDP port 110 may be sent to the output 116(2) for display on the additional display device 124(2). In the horizontal mode, in the extended desktop mode, other applications or other content may be displayed by the display device that is "down". In the horizontal mode, in the clone mode, the DRM protected content may be displayed on both the display device that is "up" and the display device that is "down" (e.g., the content is duplicated on each of the two display devices). In the horizontal mode, in the single display mode, the DRM protected content may be displayed on the display device that is "up" while no content may be displayed on the display device that is "down".

In a tablet orientation (see FIGS. 3 and 4 for more details), in which the display device 124(1) is facing in an opposite direction from the display device 124(2), the controller 126 may determine that a particular display device of the display devices 124(1) or 124(2) is visible to the user based on the data 136 (including data from the user input 142). The controller 126 may send the instruction 128 to the crossbar switch 114 to select a routing that sends the first content 140(1) from the eDP port 110 to the particular display device that is visible to the user. By routing the output of the eDP port 110 to whichever of the display devices 124(1) or 124(2) is visible to the user, the display device is able to re-orient the content when the computing device 102 is rotated. In addition, DRM protected content may be displayed in FHD by sending the output of the eDP port 110, regardless of which of the display devices 124(1) or 124(2) is "up". In the tablet orientation, the output of the eDP port 110 may be sent to the internal display device 124(1) when the internal display device 124(1) is visible to the user and may be sent to the additional display device 124(2) when the additional display device 124(2) is visible to the user. The display device that is not visible to the user may either (i) be off (e.g., in the single display mode) or (ii) display the same content being displayed on the other display device (e.g., clone mode).

In a clamshell mode (see FIG. 4 for more details) in which one of the display devices 124 is at the top and the other is at the bottom, the controller 126 may identify which of the display devices 124 is at the top based on the data 136 received from one or more of the device driver 130, the OS 132, the sensors 134, and the user input 142. In the clamshell mode, if the operating system 132 is in the extended display mode, then if the internal display device 124(1) is on top, the output of the eDP port 110 is routed to the internal display device 124(1) and the output of the DP port 112 is routed to the additional display device 124(2). If the additional display device 124(2) is on top, the output of the eDP port 110 is routed to the additional display device 124(2) and the output of the DP port 112 is routed to the internal display device 124(1). In the clamshell mode, if the operating system 132 is in the clone mode, then the output of the eDP port 110 is routed to both the internal display device 124(1) and to the additional display device 124(2). As previously discussed, DRM protected content is displayed on the display device(s) to which the output of the eDP port 110 is routed (e.g., to the display device that is determined to be at the top in single display mode or to both display devices in clone mode). DRM protected content may not be displayed in FHD resolution in extended display mode because the output of the DP port 112 is encrypted and both the internal display device 124(1) and the additional display device 124(2) lack the circuitry to decrypt and display content in FHD resolution. If DRM protected content is played back while the OS 132 is in the extended desktop mode, the DRM protected content may be shown in standard definition (SD) resolution or may not be displayed at all, depending on the type of content and the DRM constraints.

In the extended desktop mode, DRM protected content may be displayed by routing the content from the eDP port 110 to one of the display devices 124(1) or 124(2). For example, playing a movie in "full screen" expands the movie to fill the particular display device that is connected to the eDP port 110. The OS 132 may, based on the DRM protection, prevent the movie from being displayed stretched across both the display devices 124(1) and 124(2). Clone mode does not violate the DRM protection because the first content 140(1) is sent from the eDP port 110 and duplicated on both of the display devices 124(1) and 124(2). In the extended desktop mode, unprotected content may be displayed stretched across both of the display devices 124(1) and 124(2) by sending half of the unprotected content from the eDP port 110 and a remaining half of the unprotected content from the DP port 112.

The GPU 104 may support three logical pipes (e.g., three video outputs). An advantage of using the crossbar switch 114 to drive both of the display devices 124(1) and 124(2) is that a single output port (e.g., the eDP port 110 or the DP port 112) of the GPU 104 is used. For example, by using a single logical pipe (e.g., a single output port) to drive both of the display devices 124(1) and 124(2) in clone mode for protected/unprotected content or in extended desktop mode for unprotected content, the two remaining logical pipes may be used to drive one or two external displays (e.g., via the port 108). In clone mode, if the crossbar switch 114 was not present, then the GPU 104 would use two logical pipes (e.g., the eDP port 110 and the DP port 112) to send the content to both the display devices 124(1) and 124(2), thereby leaving a single pipe to drive an external display (e.g., via the port 108). In some implementations, the computing device 102 may include a third display device, with each of the three logical pipes of the GPU 104 capable of driving each of the three display devices.

Table 1 summarizes the various possible routings and which port(s) are used based on (i) whether DRM content is being played back and (ii) the display mode 144 of the operating system 132 has been selected. If the content does not have DRM protection in either single display mode or clone mode, then either of the eDP port 110 or the DP port 112 may be used. Though Table 1 does not include an entry, in some implementations, unprotected content may be routed from the DP port 112 to either of the display devices 124(1) or 124(2) in single display mode or to both of the display devices 124(1) and 124(2) in clone mode. Because there is no advantage to using the DP port 112 for unprotected content in single display mode or clone mode and because the normal routing uses the output of the eDP port 110, if content does not have DRM protection in clone mode (or single display mode), then the output of the eDP port 110 is routed both (or one) of the display devices 124(1) and 124(2).

As the examples in Table 1 illustrate, in the extended desktop mode, DRM protected content is output in an unencrypted format from the eDP port 110 and sent to either the internal display device 124(1) or the additional display device 124(2) while unprotected content is output from the DP port 112 and sent to the other display device. For example, if the output of the eDP port 110 is sent to the internal display device 124(1) then the output of the DP port 112 is sent to the additional display device 124(2). If the output of the eDP port 110 is sent to the additional display device 124(2) then the output of the eDP port 110 is sent to the internal display device 124(1).

TABLE 1

| DRM | OS Display Mode | Routing | eDP Port Output | DP Port Output |
|---|---|---|---|---|
| Yes | Single Display Mode | eDP Only | Either Internal or Additional Display | Not Used |
| Yes | Clone Mode | eDP Only | Both Displays | Not Used |
| Yes | Extended Desktop Mode | Normal or Swap | One of the two displays | The other of the two displays |
| No | Single Display Mode | eDP Only | Either Internal or Additional Display | Not Used |
| No | Clone Mode | eDP Only or DP Only | Both Display Devices or Not Used | Both Display Devices or Not Used |
| No | Extended Desktop Mode | Normal or Swap | Internal or Additional Display Device | Internal or Additional Display Device |

Thus, the controller 126 may receive the data 136(1) to 136(N) from one or more of the device driver 130, the operating system 132, or the sensors 134. The controller 126 may determine an orientation of the computing device 102 based on the data 136. Based on the orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). Based on (a) the display mode 144 (e.g., single mode, clone mode, or extended desktop mode) of the OS 132, and (b) whether the content being displayed is protected using DRM, the controller 126 may select a routing and send the instruction 128 to the crossbar switch 114 selecting the routing. The instruction 128 may cause the crossbar switch 114 to be configured to perform the selected routing. In some cases, a user may provide the user input 142 to modify (or override) the orientation determined by the controller 126, the routing determined by the controller 126, or both. If the orientation of the computing device 102 changes while the content is being displayed, the controller 126 may receive new data 136, determine a new orientation, determine a new routing, and automatically instruct the crossbar switch 114 to configure a new routing. Based on the new orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). In some cases, the user input 142 may cause the controller 126 to "lock" a particular routing configuration, a particular orientation, or both, such that the controller 126 ignores any additional data received from one or more of the device driver 130, the OS 132, or the sensors 134 until the user input 142 causes the controller 126 to remove the "lock".

Figure 2:
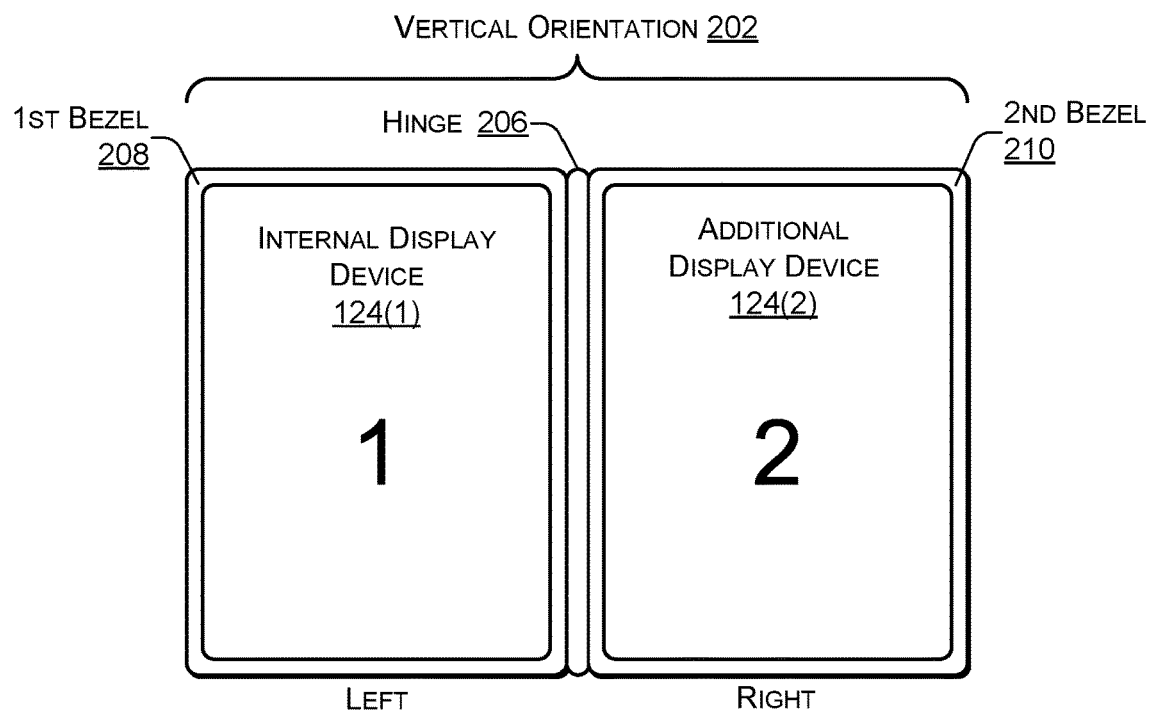
FIG. 2 is a block diagram illustrating different orientations of a dual-screen device according to some embodiments.
Figure 2:
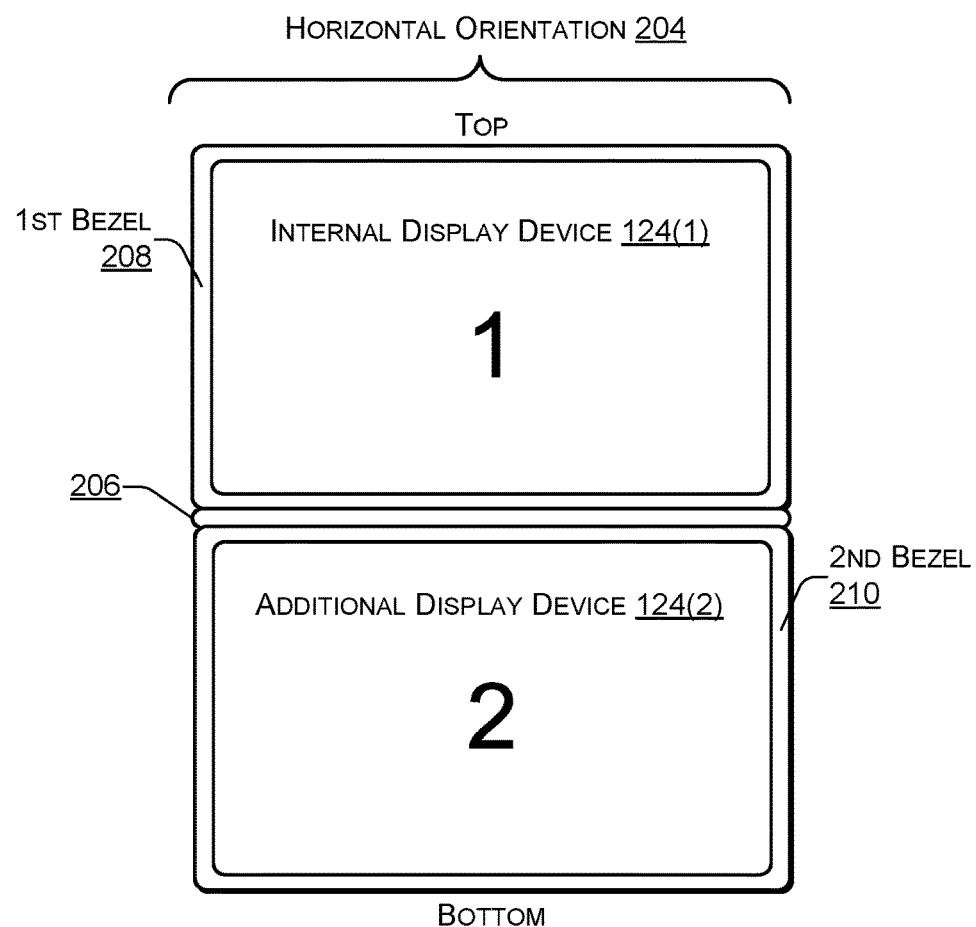
Figure 3:
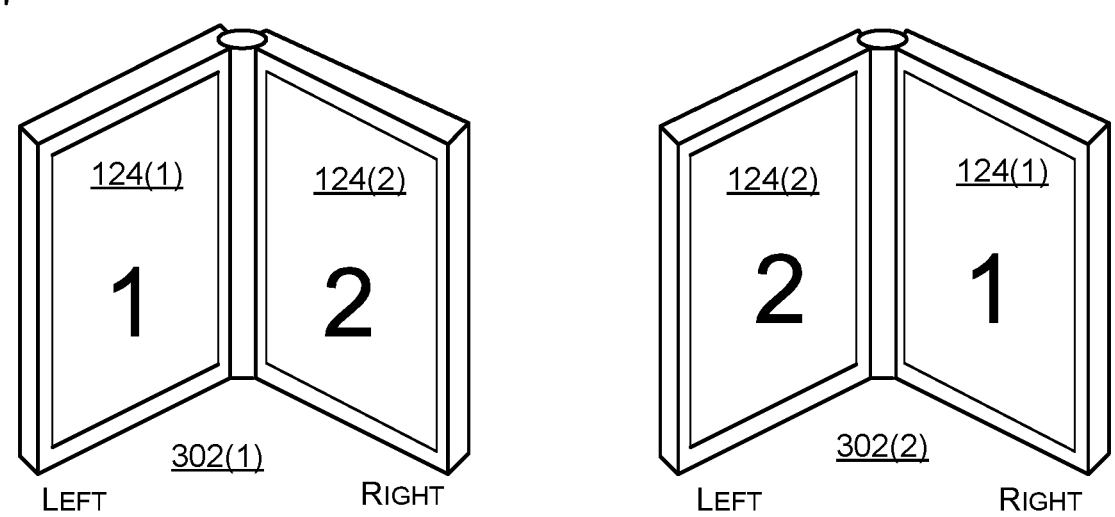
FIG. 3 is a block diagram illustrating modes of a dual-screen device in a vertical orientation according to some embodiments.
Figure 3:
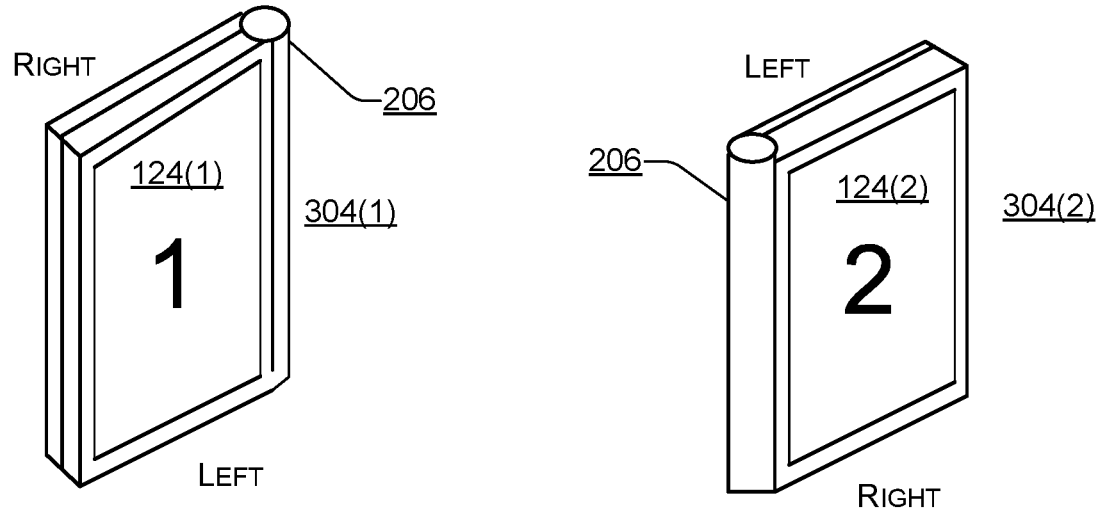

FIG. 2 is a block diagram 200 illustrating different orientations of a dual-screen device (e.g., the computing device 102 of FIG. 1) according to some embodiments. As previously noted in FIG. 1, the computing device 102 may include at least two display devices, the internal display device 124(1) and the additional display device 124(2). The computing device 102 may be displayed in a vertical (e.g., portrait) orientation 202 or a horizontal (e.g., landscape) orientation 204. For example, in the vertical orientation 202, the internal display device 124(1) may be on one side (e.g., the left side or the right side), the additional display device 124(2) may be on another side (e.g., the right side or the left side), and a hinge 206 may join the internal display device 124(1) to the additional display device 124(2). Additional examples of the vertical orientation 202 are illustrated in FIG. 3. In the horizontal orientation 204, the internal display device 124(1) may be located at the top (or the bottom) of the computing device 102 with the hinge 206 in the middle and the additional display device 124(2) at the bottom (or the top) of the computing device. Additional examples of the horizontal orientation 204 are illustrated in FIG. 4.

FIG. 3 is a block diagram 300 illustrating modes of a dual-screen device in a vertical orientation according to some embodiments. Examples of the vertical orientation 202 may include a book orientation 302 or a vertical tablet orientation 304. For example, in a first book orientation 302(1), the internal display device 124(1) may be on the left and the additional display device 124(2) may be on the right. Alternately, in a second book orientation 302(2), the additional display device 124(2) may be on the left and the internal display device 124(1) may be on the right.

In the vertical tablet orientation 304, the internal display device 124(1) may be on the left and the additional display device 124(2) may be on the right. In a first vertical tablet orientation 304(1), the internal display device 124(1) may be facing a user and the additional display device 124(2) may be rotated approximately 360 degrees to face away from the user. In a second vertical tablet orientation 304(2), the additional display device 124(2) may be facing the user while the internal display device 124(1) may rotated approximately 360 degrees to face away from the user.

Figure 4:
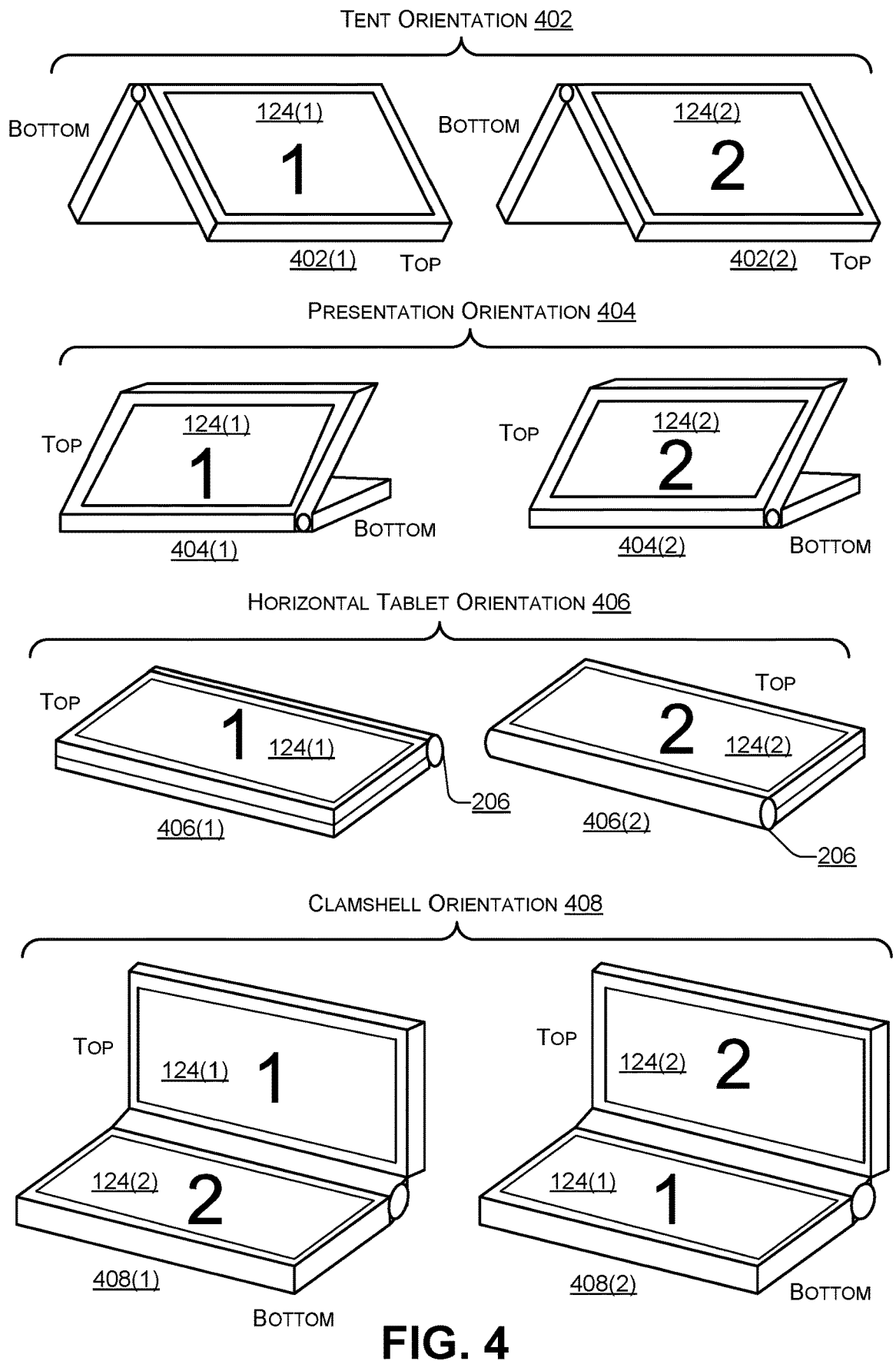
FIG. 4 is a block diagram illustrating modes of a dual-screen device in a horizontal orientation according to some embodiments.

FIG. 4 is a block diagram 400 illustrating modes of a dual-screen device in a horizontal orientation according to some embodiments. Examples of the horizontal orientation 204 may include a tent orientation 402, a presentation orientation 404, a horizontal tablet orientation 406, and a clamshell orientation 408.

In 402(1), the internal display device 124(1) may be at the top facing the user while the additional display device 124(2) may be at the bottom facing away from the user. In 402(2), the additional display device 124(2) may be at the top facing the user and the internal display device 124(1) may be at the bottom facing away from the user.

In 404(1), the internal display device 124(1) may be at the top facing the user and the additional display device 124(2) may be at the bottom facing down. In 404(2) the additional display device 124(2) may be at the top facing the user and the internal display device 124(1) may be at the bottom facing down.

In 406(1), the internal display device 124(1) may be at the top facing the user and the additional display device 124(2) may be at the bottom facing down (e.g., away from the user). In 406(2), the additional display device 124(2) may be at the top facing the user and the internal display device 124(1) may be at the bottom facing down (e.g., away from the user).

In 408(1), the internal display device 124(1) may be at the top facing the user and the additional display device 124(2) may be at the bottom facing the user (e.g., in a position where traditionally, a keyboard is located in a laptop). In 408(1), in some cases, a QWERTY-based keyboard may be displayed on the additional display device 124(2) and used to receive keyboard input. In 408(2), the additional display device 124(2) may be at the top facing the user and the internal display device 124(1) may be at the bottom facing the user (e.g., in a position where traditionally, a keyboard is located in a laptop). In 408(2), in some cases, a QWERTY-based keyboard may be displayed on the internal display device 124(1) and used to receive keyboard input.

Figure 5:
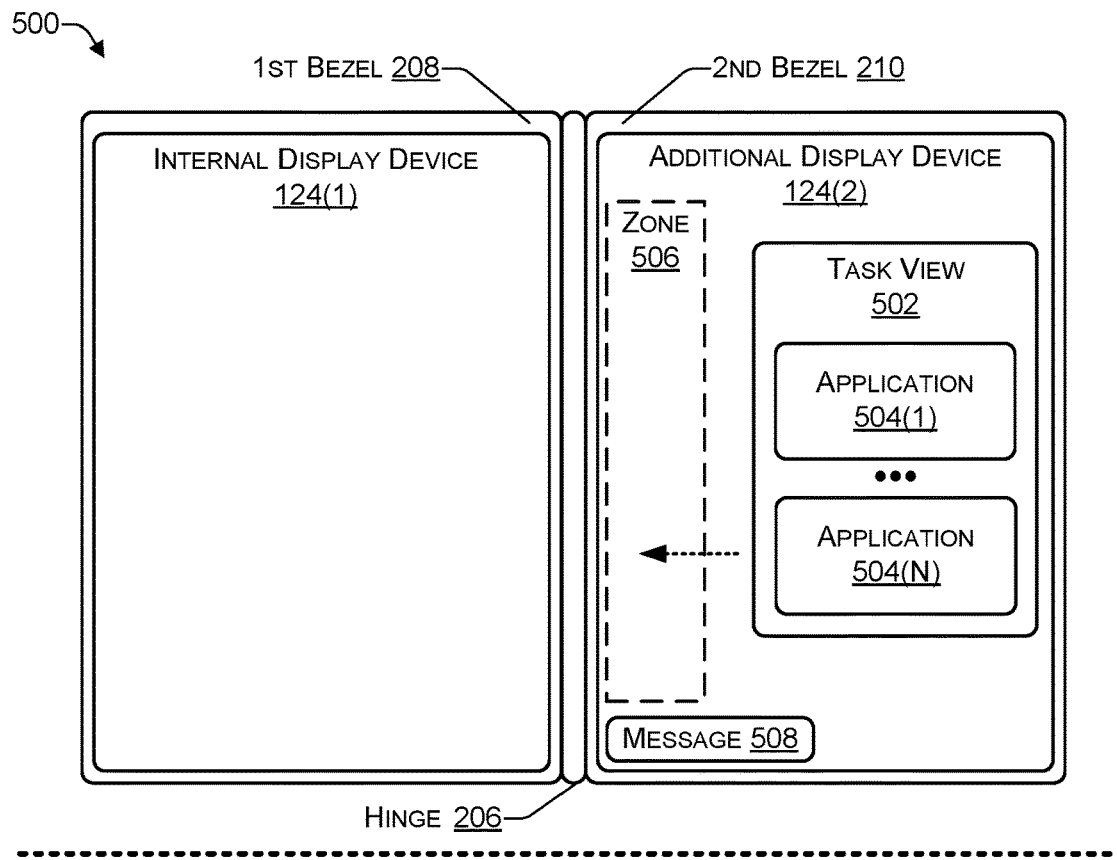
FIG. 5 is a block diagram illustrating a zone that moves an object from one display to another display according to some embodiments.
Figure 5:
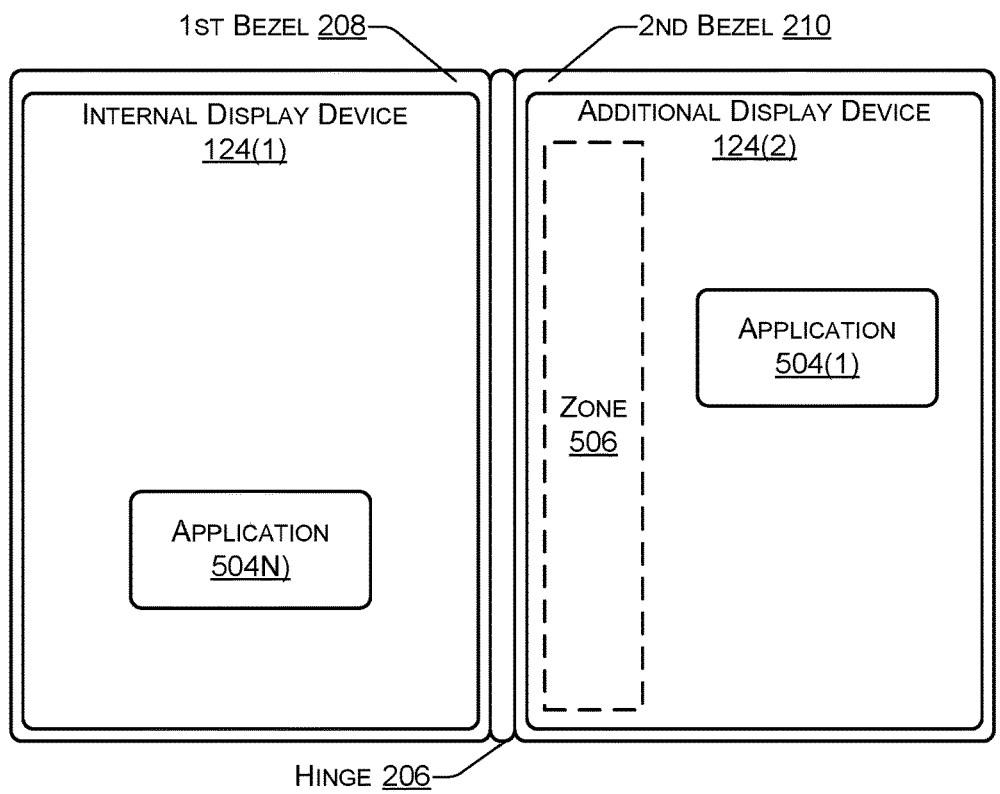

FIG. 5 is a block diagram 500 illustrating a zone that moves an object from one display to another display according to some embodiments. An object may be an application (e.g., Microsoft® Word®, PowerPoint®, Excel®, Visio®, and the like), a file that is associated with (e.g., that can be opened by) an application (a document associated with Word®, a spreadsheet associated with Excel®, a presentation file associated with PowerPoint®, and the like), a folder, or another type of file type that can be used in a computing device.

In FIG. 5, as an example, the objects include a task view window 502 and multiple applications 504(1) to 504(N) (where N>0) displayed within the task view window 502. A zone, such as the zone 506, may be defined on one or both of the display devices 124. The zone 506 may be created by the operating system 132, by one of the applications 504, or any combination thereof. The zone 506 may have a particular length, a particular width, and a particular location (e.g., located on a side of the display devices 124 that is nearest to the hinge 206). The length, width, and location of the zone 506 may be specified by the operating system 132 of FIG. 1, by one of the applications 504, or by a user of the computing device 102. For example, the operating system 132 may specify a default length, width, and location. A currently selected or currently active application may specify the length, width, and location of the zone 506 that overrides the operating system defaults. A user profile or preferences folder may include a user specified length, width, and location of the zone 506 that overrides anything specified by the operating system 132 or the applications 504.

The zone 506 may be used to transfer an object (e.g., one of the applications 504) from one of the display devices 124 to another. For example, in the top half of FIG. 5, when a user drags an object, such as the application 504(N), near (e.g., within a predetermined distance from) or partially over the zone 506, a message 508 may be displayed indicating the action to be performed ("move from current display device to adjacent display device") by the zone 506. If a user places at least a portion of the object (e.g., application 504(N)) over the zone 506, in response, the zone 506 may automatically display the object on the adjacent display device, as illustrated in the bottom half of FIG. 5. Thus, the action associated with the zone 506 may be to move an object (e.g., the application 504(N)) from one display device (e.g., the display device 124(2)) and display the object on an adjacent display device (e.g., the display device 124(1)) of the computing device 102.

In some cases, the zone 506 may automatically display the object on the adjacent display device after determining that at least a portion of the object is over the zone 506, while the user is still holding (e.g., applying pressure to) the object. In other cases, the zone 506 may automatically display the object on the adjacent display device after determining that at least a portion of the object is over the zone 506, and after the user has released the object onto the zone 506 (e.g., the user is no longer applying pressure to the object on the touch screen display device).

The zone 506 may display the message 508 to inform the user of the action (e.g., "move to other screen") to be performed. After the message 508 has been displayed for a predetermined amount of time (e.g., M milliseconds, where M>0), the zone 506 may determine whether at least a portion of the object is over the zone 506. Thus, the user may be given a pre-determined amount of time after the message 508 is displayed to drag the object away from the zone 506 before the action is performed. After the message 508 has been displayed for the predetermined amount of time, if at least a portion of the object is over the zone 506, the action (e.g., moving and displaying the object on an adjacent display device) may be performed. After the message 508 has been displayed for the predetermined amount of time, if no portion of the object is over the zone 506, then the action is not performed.

The message 508 may include a prompt informing the user of the action that will be performed and asking the user to confirm (e.g., "move to other screen—please confirm"). Thus, the user may be asked to confirm whether to perform the action associated with the zone 506. If the user confirms, then the action (e.g., moving and displaying the object on an adjacent display device) may be performed. If the user does not confirm, then the action is not performed.

Figure 6:
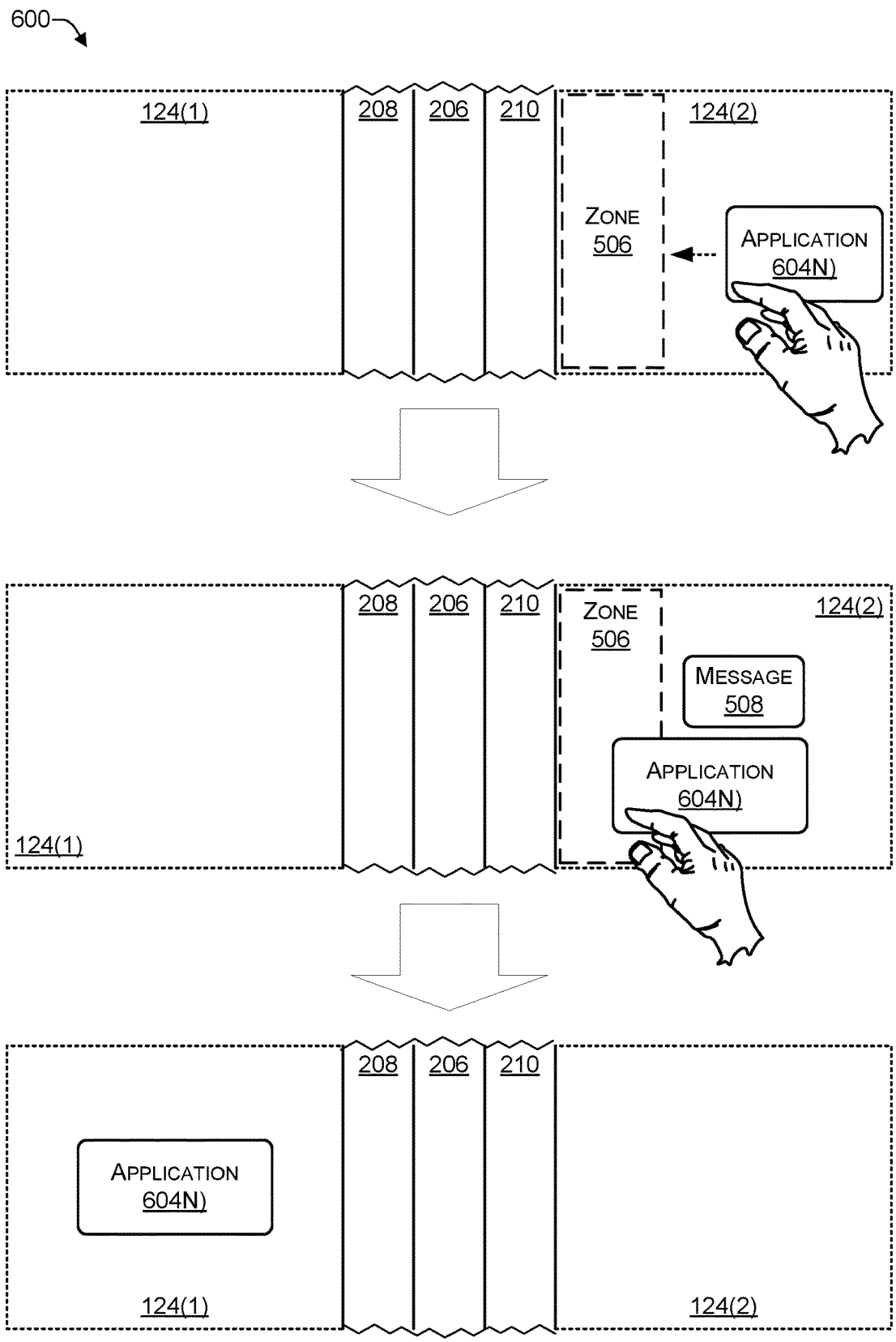
FIG. 6 is a block diagram illustrating displaying a message indicating an action that will be performed when a portion of an object enters a zone according to some embodiments.

While FIGS. 5 and 6 illustrate the action of moving an object from a first display device to a second display device (or vice-versa), it should be understood that other actions may be performed. For example, default actions may be specified by the operating system and overridden by a particular application or by user preferences. To illustrate, a user may specify that when an object, such as file, that is being displayed on a first display device is moved on to the zone 506, the action causes the file to be launched using the associated application on the second display device. For example, the user may drag a Word® document displayed on the display device 124(2) on to the zone 506, causing an action in which the Word® application opens the document on the display device 124(1). As another example, the user may drag a media file (e.g., audio file or video file) on the display device 124(2) to the zone 506, causing an action in which a media playback application initiates playback of the media file on the display device 124(1).

FIG. 6 is a block diagram 600 illustrating displaying a message indicating an action that will be performed when a portion of an object enters a zone according to some embodiments. While the various figures herein illustrate a finger of a hand as interacting with the touch screen display devices 124(1), 124(2), it should be understood that another human appendage, a stylus, or another type of input device may be used to provide touch input. In addition to touch input, other input devices, such as a mouse, a trackball, a trackpad or the like may be used to provide input, such as for example, selecting and dragging an object.

As illustrated at the top of FIG. 6, the user may select and drag an object, such as the application 604(N), towards the zone 506. As illustrated at the middle of FIG. 6, when the object is over (or within a predetermined distance from) the zone 506, the zone 506 may display the message 508 indicating the action the zone 506 may perform on the object. As illustrated at the bottom of FIG. 6, the zone 506 may perform an action on the object, such as moving the object from one screen (124(2)) to an adjacent screen (124(1)) of the dual screen computing device 102. In some cases, the zone 506 may display the message 508 for a predetermined amount of time and then perform the action on the object if at least a portion of the object has been placed over the zone 506. In other cases, the zone 506 may display the message 508 that includes a prompt ("perform<action>?"), receive a response (e.g., yes or no) to the prompt from the user, and then perform the action on the object if the user responded "yes" to the prompt and not perform the action if the user responded "no".

Figure 7:
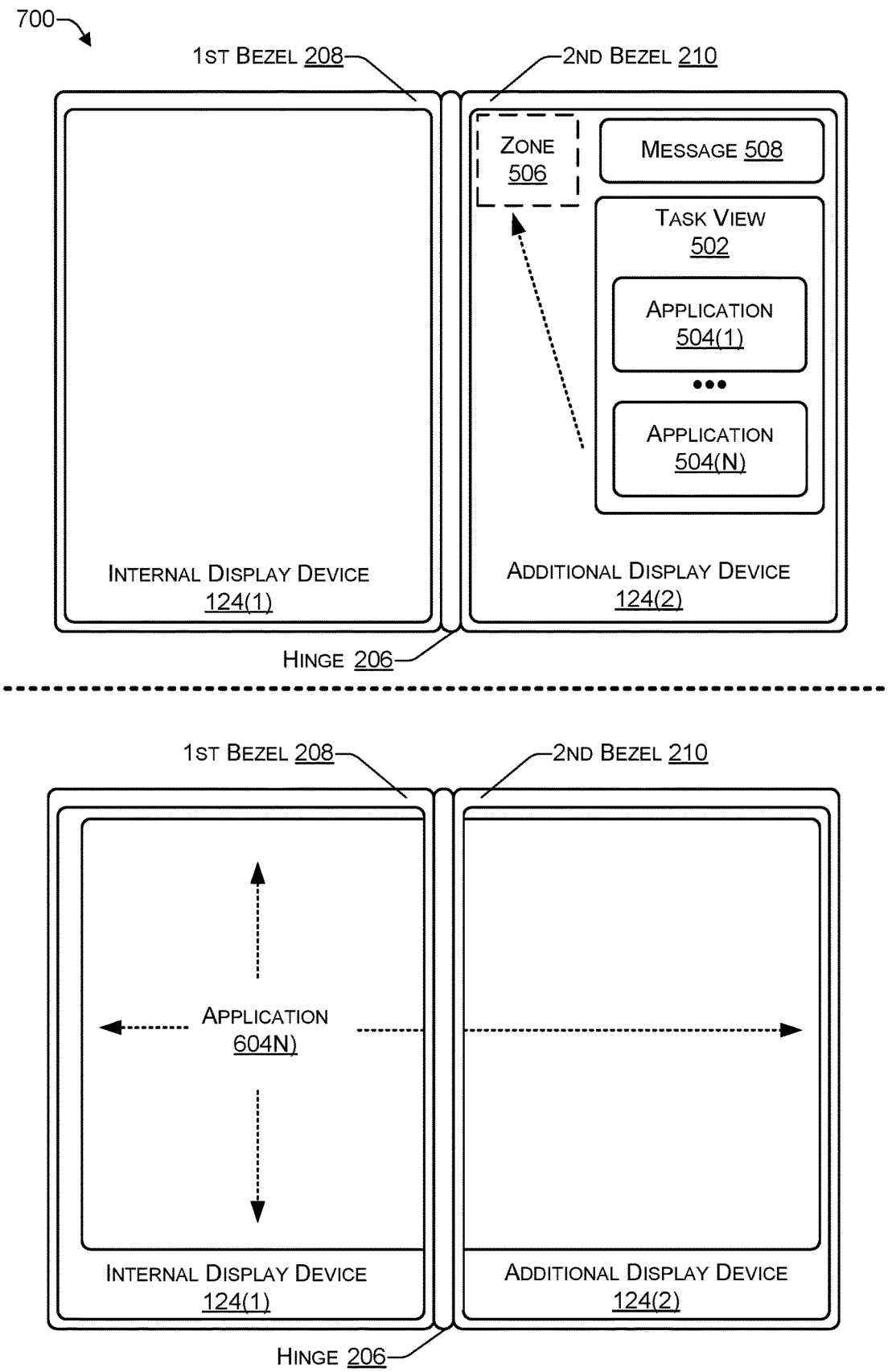
FIG. 7 is a block diagram illustrating a zone that opens an object across two display devices according to some embodiments.

FIG. 7 is a block diagram 700 illustrating a zone that opens an object across two display devices according to some embodiments. The zone 506 may be used to maximize an object (e.g., one of the applications 504) across both of the display devices 124(1), 124(2). For example, in the top half of FIG. 7, when a user drags an object, such as the application 504(N), near (e.g., within a predetermined distance from) or partially over the zone 506, a message 508 may be displayed indicating the action to be performed ("open to span both display devices") by the zone 506. If a user places at least a portion of the object (e.g., application 504(N)) over the zone 506, in response, the zone 506 may automatically open (e.g., maximize) the object window across the display devices 124(1), 124(2), as illustrated in the bottom half of FIG. 5. Thus, the action associated with the zone 506 may be to open (e.g., maximize) an object (e.g., the application 504(N)) to span both the display devices 124(1), 124(2) of the computing device 102.

In some cases, the zone 506 may automatically open the object to span both display devices 124(1), 124(2) after determining that at least a portion of the object is over the zone 506, e.g., while the user is still applying pressure to the object. In other cases, the zone 506 may automatically open the object to span both display devices 124(1), 124(2) after determining that at least a portion of the object is over the zone 506, and after the user has released the object onto the zone 506 (e.g., the user is no longer applying pressure to the object on the touch screen display device).

The zone 506 may display the message 508 to inform the user of the action (e.g., "open to span both displays" or "maximize across both displays") to be performed. After the message 508 has been displayed for a predetermined amount of time (e.g., M milliseconds, where M>0), the zone 506 may determine whether at least a portion of the object is over the zone 506. Thus, the user may be given a pre-determined amount of time after the message 508 is displayed to drag the object away from the zone before the action is performed. After the message 508 has been displayed for the predetermined amount of time, if at least a portion of the object is over the zone 506, the action (e.g., opening the object to span both display devices) may be performed. After the message 508 has been displayed for the predetermined amount of time, if no portion of the object is over the zone 506, then the action is not performed.

The message 508 may include a prompt informing the user of the action that will be performed and asking the user to confirm (e.g., "maximize across both display devices?— please confirm"). Thus, the user may be asked to confirm whether to perform the action associated with the zone 506. If the user confirms, then the action (e.g., opening the object to span both display devices) may be performed. If the user does not confirm, then the action may not be performed.

Figure 8:
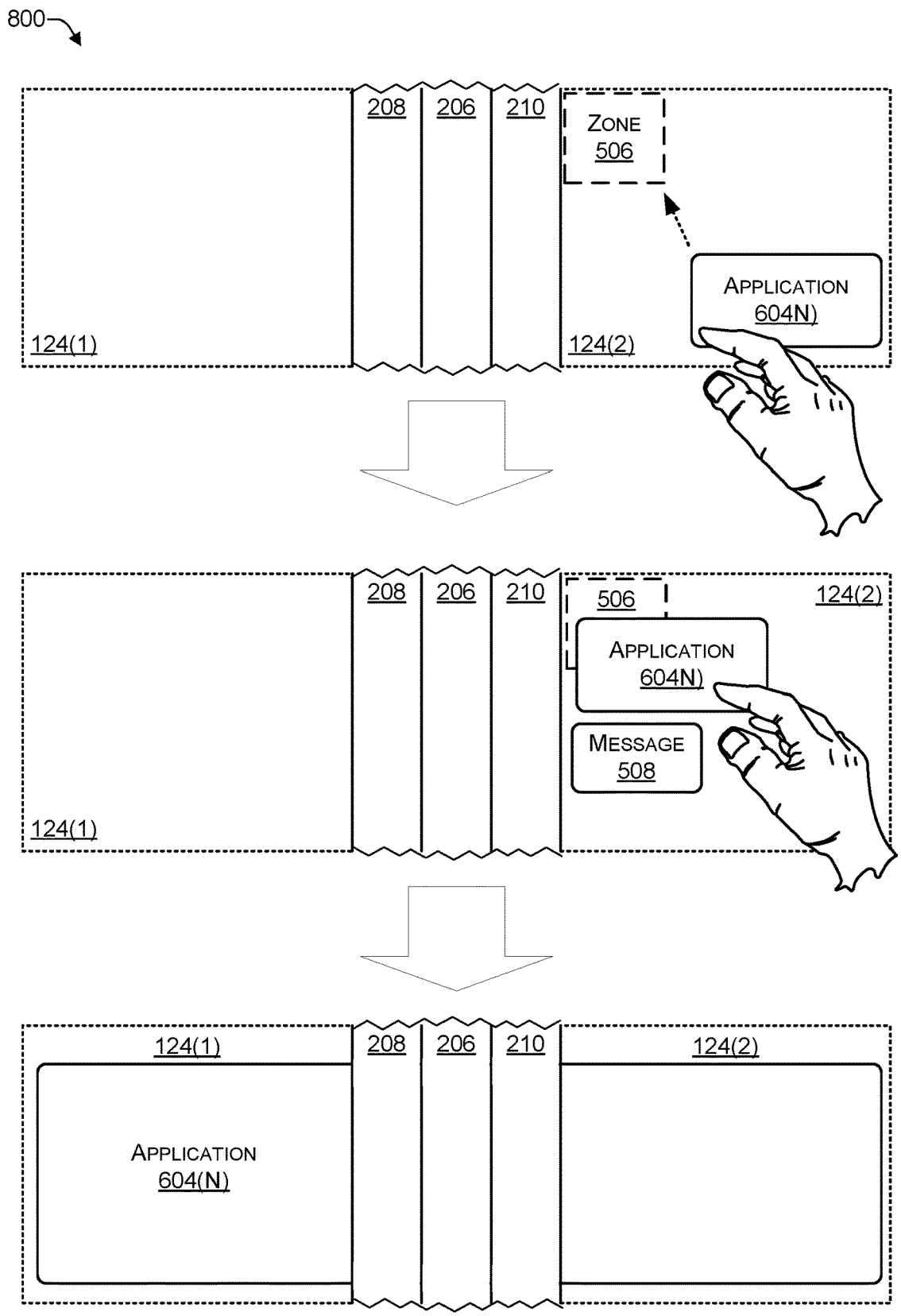
FIG. 8 is a block diagram illustrating a zone that displays a message indicating an action associated with the zone according to some embodiments.

FIG. 8 is a block diagram 800 illustrating a zone that displays a message indicating an action associated with the zone according to some embodiments. As illustrated at the top of FIG. 8, the user may select and drag an object, such as the application 604(N), towards the zone 506. As illustrated at the middle of FIG. 8, when the object is over (or within a predetermined distance from) the zone 506, the zone 506 may display the message 508 indicating the action the zone 506 may perform on the object. As illustrated at the bottom of FIG. 8, the zone 506 may perform an action on the object, such as opening (e.g., maximizing) the object to span the display devices 124(1), 124(2) of the dual screen computing device 102. In some cases, the zone 506 may display the message 508 for a predetermined amount of time and then perform the action on the object if at least a portion of the object has been placed over the zone 506. In other cases, the zone 506 may display the message 508 that includes a prompt ("perform<action>?"), receive a response (e.g., yes or no) to the prompt from the user, and then perform the action on the object if the user responded "yes" to the prompt and not perform the action if the user responded "no".

While FIGS. 7 and 8 illustrate the action of maximizing an object across a first display device and a second display device, it should be understood that other actions may be performed. For example, default actions may be specified by the operating system and overridden by a particular application or by user preferences. To illustrate, a user may specify that when an object, such as file, that is being displayed on a first display device is moved on to the zone 506, the action causes the file to be launched using the associated application and maximized across both display devices 124(1), 124(2). For example, the user may drag a Word® document displayed on the display device 124(2) on to the zone 506, causing an action in which the Word® application opens the document in a window and maximizes the document window the on the display devices 124(1), 124(2). As another example, the user may drag a media file (e.g., audio file or video file) on the display device 124(2) to the zone 506, causing an action in which a media playback application initiates playback of the media file and the media playback application (e.g., playing back a movie) is maximized across both the display devices 124(1), 124(2).

Figure 9:
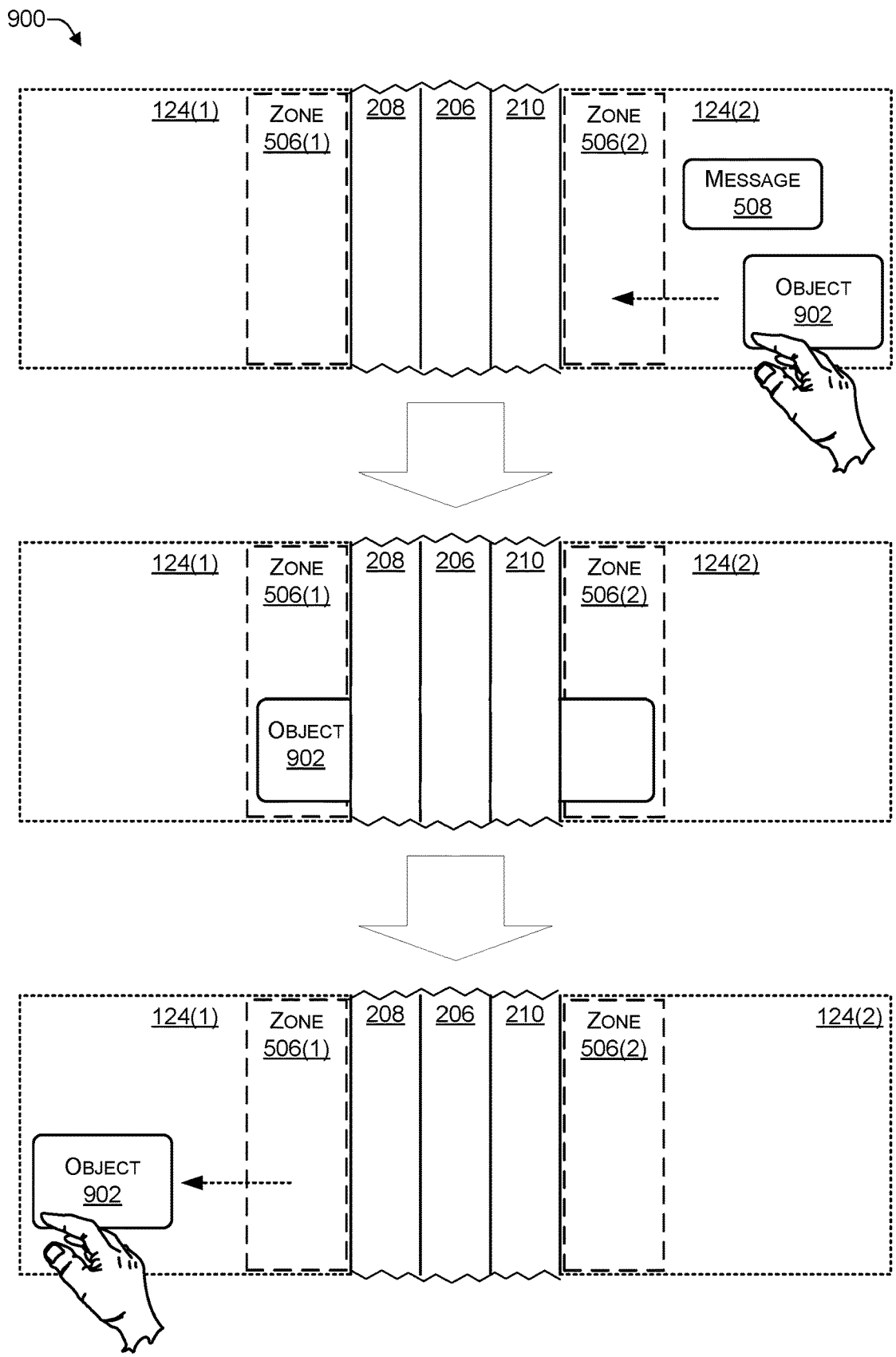
FIG. 9 is a block diagram illustrating a zone to hold objects that can be removed and placed on either a first display device or a second display device according to some embodiments.

FIG. 9 is a block diagram 900 illustrating a zone to hold objects that can be removed and placed on either a first display device or a second display device according to some embodiments. The zone 506 may include a first portion 506(1) on the display device 124(1) and a second portion 506(2) on the display device 124(2). The zone 506 may be used as a clipboard to temporarily store multiple objects, such as the representative object 902. When an object is stored in the zone 506, a first portion of the object may be displayed in 506(1) on the display device 124(1) and a second portion of the object may be displayed in 506(2) on the display device 124(2), enabling the user to remove the object from the zone 506 and place the object where the user desires. In some cases, the portions of the object 902 that are displayed in the zones 506(1), 506(2) may be scaled to be smaller to enable the portions to be displayed with other portions of other objects. The zone 506 may enable the user to place an object located on one of the display devices 124(1), 124(2) and retrieve the object from the other of the display devices 124(1), 124(2). When objects, such as the representative object 902, are stored in the zone 506, other objects displayed on either the display device 124(1) or the display device 124(2) may continue to be used and manipulated by the user, without affecting the objects that are stored in the zone 506.

As illustrated at the top of FIG. 9, when a user drags an object, such as the object 902 (e.g., a file, an application, a folder, or the like), near (e.g., within a predetermined distance from) or partially over the zone 506(2), the message 508 may be displayed indicating the action to be performed ("store in clipboard") on the object 902. After the message 508 has been displayed, if at least a portion of the object 902 is over the zone 506, in response, as illustrated in the middle of FIG. 9, the zone 506 may place the object 902 in the zone 506, with a first portion of the object 902 displayed in the zone 506(1) and a second portion of the object 902 displayed in the zone 506(2). Thus, the action associated with the zone 506 may be to store the object 902 and display a portion of the object 902 on each of the display devices 124(1), 124(2) of the computing device 102. As illustrated in the bottom of FIG. 9, the user may select an object, such as the object 902, stored in the zone 506, and drag the object to either of the display devices 124(1), 124(2). Thus, FIG. 9 illustrates the user dragging the object 902 displayed on the display device 124(2) for storage in the zone 506. The user then retrieves the object 902 from the zone 506 and drags the object 902 to a desired location on the display device 124(1). In this way, the user can temporarily store multiple objects that were being displayed on either of the display devices 124(1), 124(2) and then re-position the multiple objects across the display devices 124(1), 124(2).

In some cases, the zone 506 may automatically place the object 902 in the zone 506 after determining that at least a portion of the object 902 is over the zone 506, e.g., while the user is still applying pressure to the object. In other cases, the zone 506 may automatically place the object 902 in the zone 506 after determining that at least a portion of the object 902 is over the zone 506, and after the user has released the object 902 onto the zone 506 (e.g., the user is no longer applying pressure to the object 902 on the touch screen display device 124(2)).

The zone 506 may display the message 508 to inform the user of the action (e.g., "store in clipboard with access from both display devices") to be performed. After the message 508 has been displayed for a predetermined amount of time (e.g., M milliseconds, where M>0), the zone 506 may determine whether at least a portion of the object 902 is over the zone 506. Thus, the user may be given a pre-determined amount of time after the message 508 is displayed to drag the object 902 away from the zone 506 before the action is performed. After the message 508 has been displayed for the predetermined amount of time, if at least a portion of the object 902 is over the zone 506, the action (e.g., temporarily storing the object 902 in the zone 506) may be performed. After the message 508 has been displayed for the predetermined amount of time, if no portion of the object 902 is over the zone 506, then the action may not be performed.

The message 508 may include a prompt informing the user of the action that will be performed and asking the user to confirm (e.g., "store in clipboard with access from both display devices?—please confirm"). Thus, the user may be asked to confirm whether to perform the action associated with the zone 506. If the user confirms, then the action may be performed. If the user does not confirm, then the action may not be performed.

Figure 10:
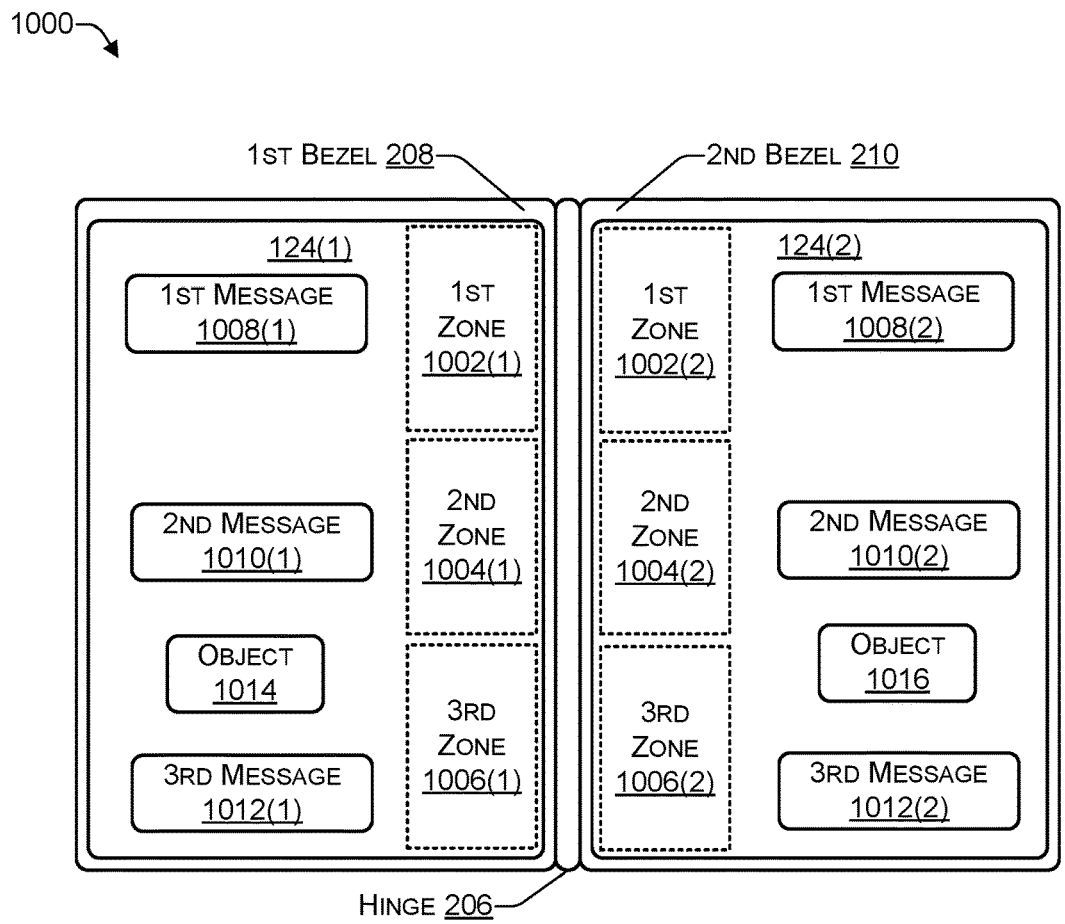
FIG. 10 is a block diagram illustrating creating multiple zones for a dual-display device according to some embodiments.

FIG. 10 is a block diagram 1000 illustrating creating multiple zones for a dual-display device according to some embodiments. The operating system, a particular application, or the user's preferences may define one or more zones, the size and location of each zone, and the action performed by each zone. For example, three zones 1002, 1004, and 1006 may be defined. Of course, more than three zones or less than three zones may be created depending on the size of the display devices 124(1), 124(2). The zones 1002, 1004, 1006 may be defined for the display device 124(1), the display device 124(2), or both the display devices 124(1), 124(2). For example, the display device 124(1) may include the zones 1002(1), 1004(1), and 1006(1) and the display device 124(2) may include the zones 1002(2), 1004(2), and 1006(2).

Each zone may have an associated message that indicates the action that the zone performs. For example, the first zone 1002 may have an associated message 1008 indicating a first action, such as maximizing an object across both of the display devices 124(1), 124(2). The second zone 1004 may have an associated message 1010 indicating a second action, such as moving an object from one of the display devices 124(1), 124(2) to another of the display devices 124(1), 124(2). The third zone 1006 may have an associated message 1012 indicating a third action, such as moving temporarily storing an object from one of the display devices 124(1), 124(2) for subsequent retrieval on another of the display devices 124(1), 124(2).

If a first portion of an object is near (or over) one zone and a second portion of the object is near (or over) another zone, the computing device 102 may prompt the user to select whether to perform an action and if so, which action to perform, e.g., "Please select one: perform <action associated with one zone>, perform <action associated with another zone>, or perform no action?"

The zones 1002, 1004, 1006 enable a user to cause various pre-programmed actions to be performed merely by dragging and dropping an object to a particular one of the zones 1002, 1004, or 1006. For example, dragging and dropping an object 1014 on the first zone 1002(1) may cause the object 1014 to be maximized to span both of the displays 124(1), 124(2). Dragging and dropping the object 1014 on the second zone 1004(1) may cause the object 1014 to be moved to from the display 124(1) to the display 124(2). Dragging and dropping the object 1014 on the third zone 1006(1) may cause the object 1014 to be stored and displayed in both the zones 1006(1), 1006(2), thereby enabling the object 1014 to be dragged from the zone 1006 to either of the display devices 124(1) or 124(2). Dragging and dropping an object 1016 on the first zone 1002(2) may cause the object 1016 to be maximized to span both of the displays 124(1), 124(2). Dragging and dropping the object 1016 on the second zone 1004(2) may cause the object 1016 to be moved to from the display 124(2) to the display 124(1). Dragging and dropping the object 1016 on the third zone 1006(2) may cause the object 1016 to be stored and displayed in both the zones 1006(1), 1006(2), thereby enabling the object 1012 to be dragged from the zone 1006 to either of the display devices 124(1) or 124(2). Of course, the pre-defined actions described are merely examples of the types of actions that may be defined.

Figure 11:
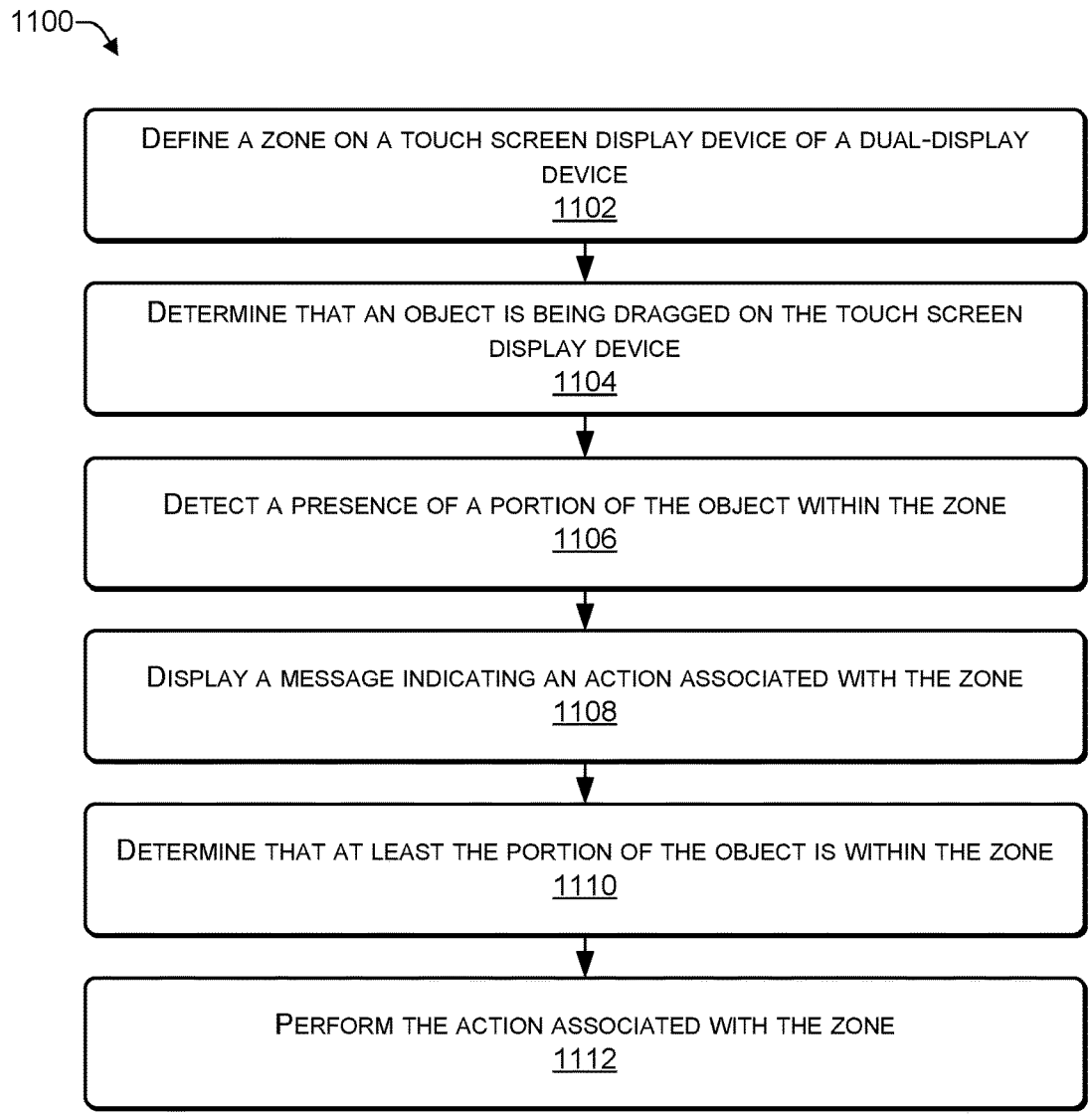
FIG. 11 is a flowchart of a process that includes determining that at least a portion of an object is within the zone according to some embodiments.
Figure 12:
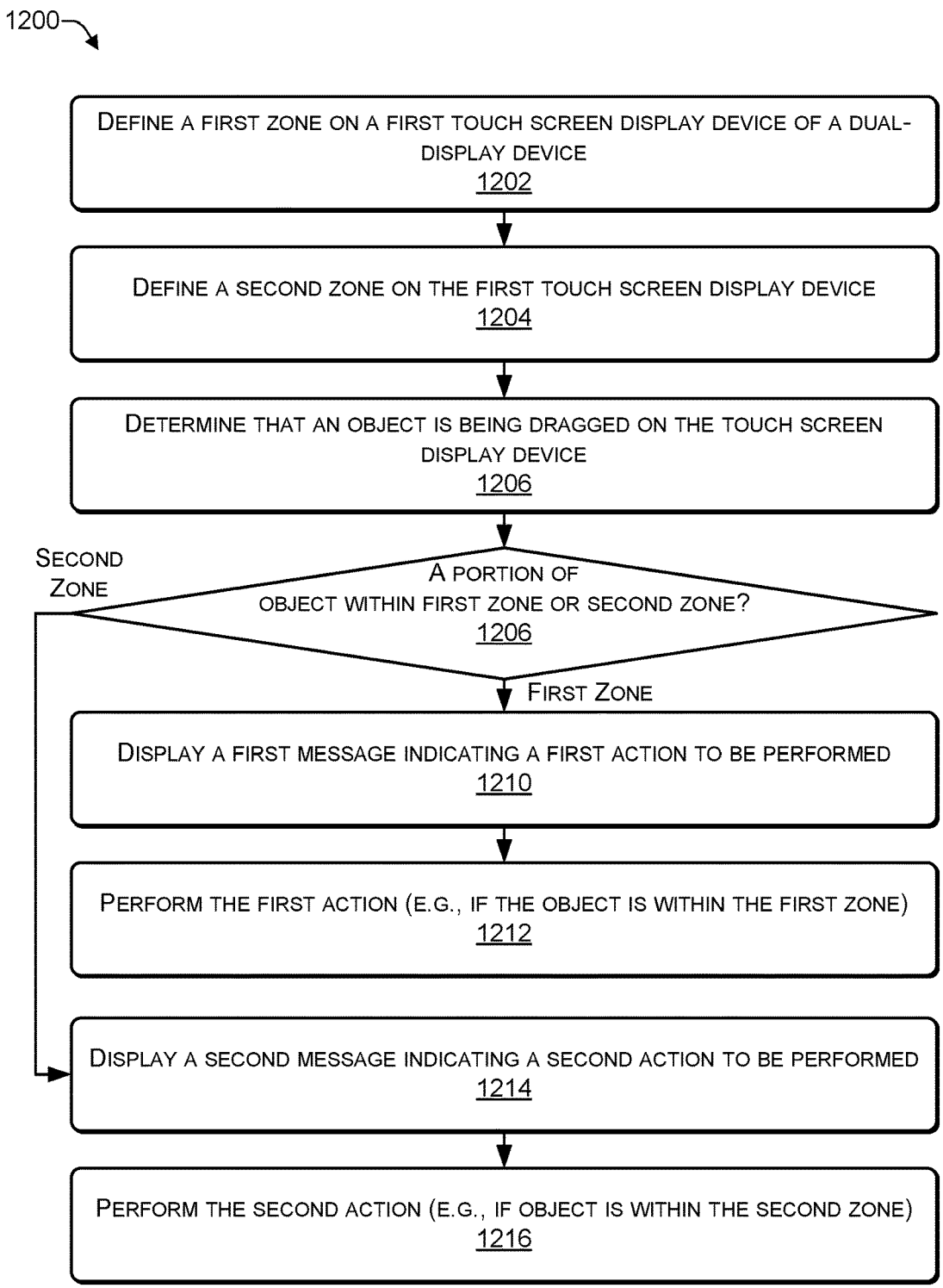
FIG. 12 is a flowchart of a process that includes determining whether a portion of an object is within a first zone or within a second zone according to some embodiments.
Figure 13:
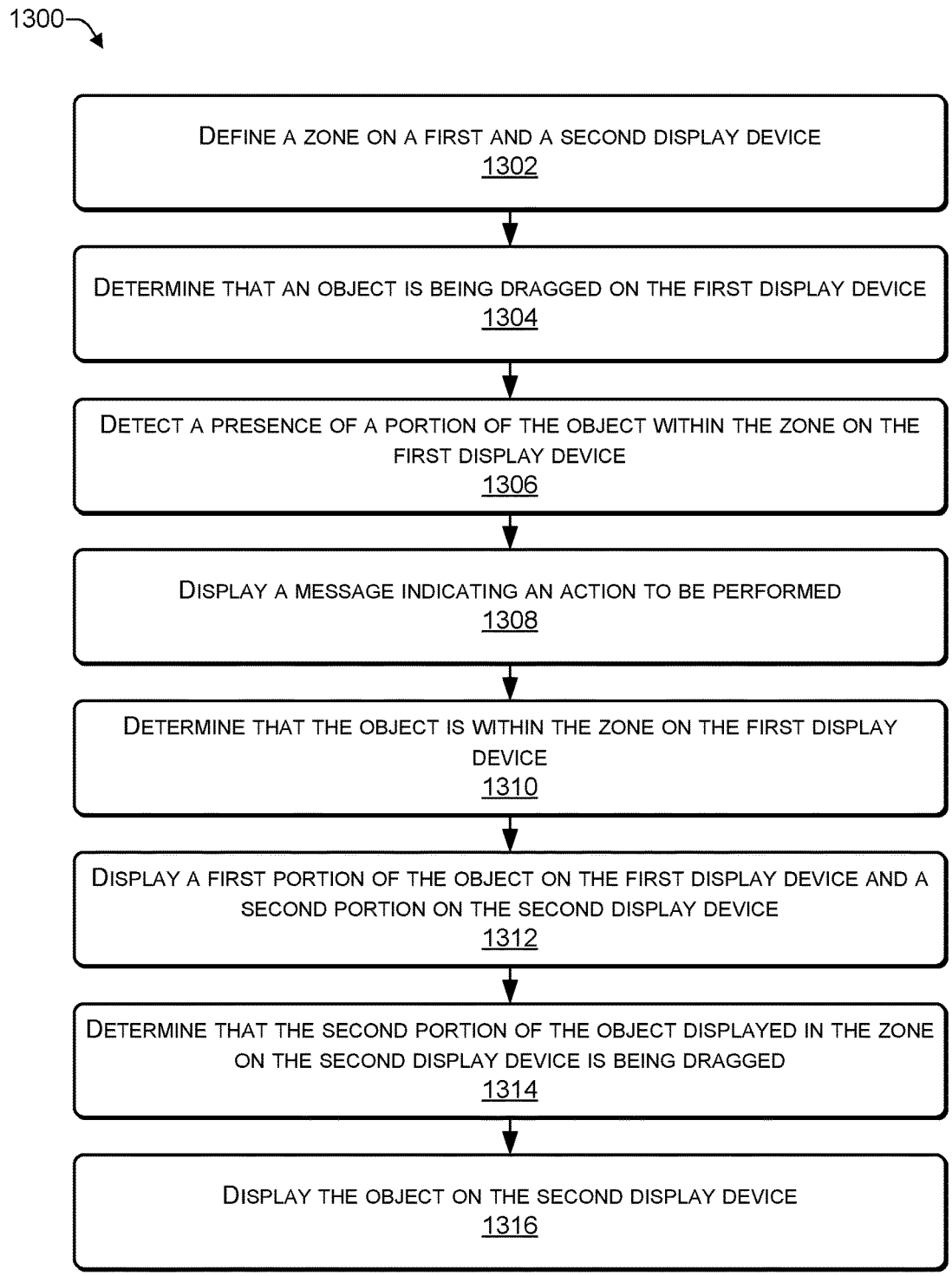
FIG. 13 a flowchart of process that includes displaying a message indicating an action associated with a zone according to some embodiments.

In the flow diagrams of FIGS. 11, 12, and 13, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1100, 1200, and 1300 are described with reference to FIG. 1, 2, 3, 4, 5, 6, 7, 8, 9, or 10 as described above, although other models, frameworks, systems and environments may be used to implement these processes.

FIG. 11 is a flowchart of a process 1100 that includes determining that at least a portion of an object is within a zone according to some embodiments. The process 1100 may be performed by one or more components of the computing device 102 of FIG. 1.

At 1102, a zone may be defined on a touch screen display device of a dual-display device. At 1104, a determination may be made that an object is being dragged on the touch screen display device. At 1106, a presence of at least a portion of the object may be detected within the zone. At 1108, a message indicating an action (associated with the zone) may be displayed. For example, in FIG. 6, the zone 506 may be defined. The computing device may determine that a user has selected and is dragging an object, such as the application 604(N). When at least a portion of the object is over (or within a predetermined distance from) the zone 506, the zone 506 may display the message 508 indicating the action the zone 506 performs. In some cases, the zone 506 may display the message 508 for a predetermined amount of time and then perform the action on the object if at least a portion of the object has been placed over the zone 506. In other cases, the zone 506 may display the message 508 that includes a prompt ("perform<action>?"), receive a response (e.g., yes or no) to the prompt from the user, and then perform the action on the object if the user responded "yes" to the prompt and not perform the action if the user responds "no".

At 1110, a determination may be made that at least the portion of the object is (e.g., remains) within the zone. At 1112, the action associated with the zone may be performed. In FIG. 6, after determining that at least a portion of the object is within the zone 506, the zone 506 may perform an action on the object. The action that is performed may include at least one of moving the object from a current display device to an adjacent display device, maximizing the object on to span two display devices, storing the object in a clipboard for subsequent retrieval, playing a media file using a media playback application, another action, or any combination thereof.

FIG. 12 is a flowchart of a process 1200 that includes determining whether a portion of an object is within either a first zone or a second zone according to some embodiments. The process 1200 may be performed by one or more components of the computing device 102 of FIG. 1.

At 1202, a first zone may be defined on a first touch screen display device of a dual-display device. At 1204, a second zone may be defined on the first touch screen display device. For example, in FIG. 10, the first zone 1002, the second zone 1004, and the third zone 1006 may be defined by the operating system, an application, or based on user specified information.

At 1206, a determination may be made that an object is being dragged on the touch screen display device. At 1208, a determination may be made whether at least a portion of the object is within either the first zone or the second zone. For example, in FIG. 10, the computing device 102 may determine that the object 1014 (or the object 1016) is being dragged and determine if at least a portion of the object is within one of the zones 1002, 1004, 1006.

If a determination is made, at 1208, that a portion of the object is within the first zone, then the process proceeds to 1210. If a determination is made, at 1208, that a portion of the object is within the second zone, then the process proceeds to 1214. If a determination is made, at 1208, that no portion of the object is within either the first zone or the second zone then no action is taken. At 1210, a first message may be displayed indicating a first action (associated with the first zone) to be performed. At 1212, the first action (associated with the first zone) may be performed if the object is within the first zone. At 1214, a second message may be displayed indicating a second action (associated with the second zone) to be performed. At 1216, the second action (associated with the second zone) may be performed if the object is within the second zone. For example, in FIG. 10, if the computing device 102 determines that at least a portion of the object 1014 (or the object 1016) is within the first zone 1002, then the first message 1008 may be displayed. If the computing device 102 determines that at least a portion of the object 1014 (or the object 1016) is within the second zone 1004, then the second message 1010 may be displayed.

If the computing device 102 determines that at least a portion of the object 1014 (or the object 1016) is within the third zone 1006, then the third message 1012 may be displayed. If the computing device 102 determines that no portion of the object 1014 (or the object 1016) is within any of the zones 1002, 1004, and 1006, then no action may be taken. In some cases, the message 1008, 1010, or 1012, may be displayed for a predetermined amount of time and the zone may perform the corresponding action on the object if at least a portion of the object has been placed over the corresponding zone 1002, 1004, or 1006, respectively. In other cases, the corresponding message 1008, 1010, or 1012 may include a prompt ("perform <action>?"), receive a response (e.g., yes or no) to the prompt from the user, and then perform the corresponding action on the object if the user responds "yes" to the prompt and not perform the action if the user responds "no". In FIG. 10, after determining that at least a portion of the object 1014 (or the object 1016) is within either the zone 1002, the zone 1004, or the zone 1006, an action corresponding to the zone may be performed. The action that is performed may include at least one of moving the object from a current display device to an adjacent display device, maximizing the object on to span two display devices, storing the object in a clipboard for subsequent retrieval, playing a media file using a media playback application, another action, or any combination thereof.

FIG. 13 is a flowchart of process that includes displaying a message indicating an action associated with a zone according to some embodiments. The process 1300 may be performed by one or more components of the computing device 102 of FIG. 1.

At 1302, a zone may be defined that spans both a first display device and a second display device. At 1304, a determination may be made that an object is being dragged on the first display device. At 1306, a presence of at least a portion of the object may be detected within (e.g., over) the zone of the first display device. At 1308, a message may be displayed indicating an action to be performed if at least the portion of the object remains within the zone. For example, in FIG. 9, the zone 506 may include a first portion 506(1) on the display device 124(1) and a second portion 506(2) on the display device 124(2). The zone 506 may be used as a clipboard to temporarily store multiple objects, such as the representative object 902. When an object is stored in the zone 506, a first portion of the object may be displayed in 506(1) on the display device 124(1) and a second portion of the object may be displayed in 506(2) on the display device 124(2), enabling the user to remove the object from the zone 506 and place the object on either of the display devices 124(1), 124(2). For example, the zone 506 may enable the user to place an object located on one of the display devices 124(1), 124(2) and retrieve the object from the other of the display devices 124(1), 124(2). As illustrated at the top of FIG. 9, when a user drags an object, such as the object 902 (e.g., a file, an application, a folder, or the like), near (e.g., within a predetermined distance from) or over the zone 506(2), the message 508 may be displayed indicating the action to be performed ("store in clipboard") on the object 902.

At 1310, a determination may be made that at least a portion of the object is within the zone on the first display. At 1312, the object may be stored in the zone, with a first portion of the object displayed on the first display and a second portion of the object displayed on the second display. At 1314, a determination may be made that the second portion of the object being displayed in the zone on the second display device is being dragged. At 1316, the object may be displayed on the second display device (e.g., outside the zone). For example, in FIG. 9, after the message 508 has been displayed, if at least a portion of the object 902 is over the zone 506, the object 902 may be placed in the zone 506, with a first portion of the object 902 displayed in the zone 506(1) and a second portion of the object 902 displayed in the zone 506(2). As illustrated in the bottom of FIG. 9, the user may select an object, such as the object 902, stored in the zone 506, and drag the object to either of the display devices 124(1), 124(2). Thus, FIG. 9 illustrates the user dragging the object 902 displayed on the display device 124(2) for storage in the zone 506. The user then retrieves the object 902 from the zone 506 and drags the object 902 to a desired location on the display device 124(1). In this way, the user can temporarily store multiple objects that were being displayed on either of the display devices 124(1), 124(2) and then re-position the multiple objects across the display devices 124(1), 124(2).

Figure 14:
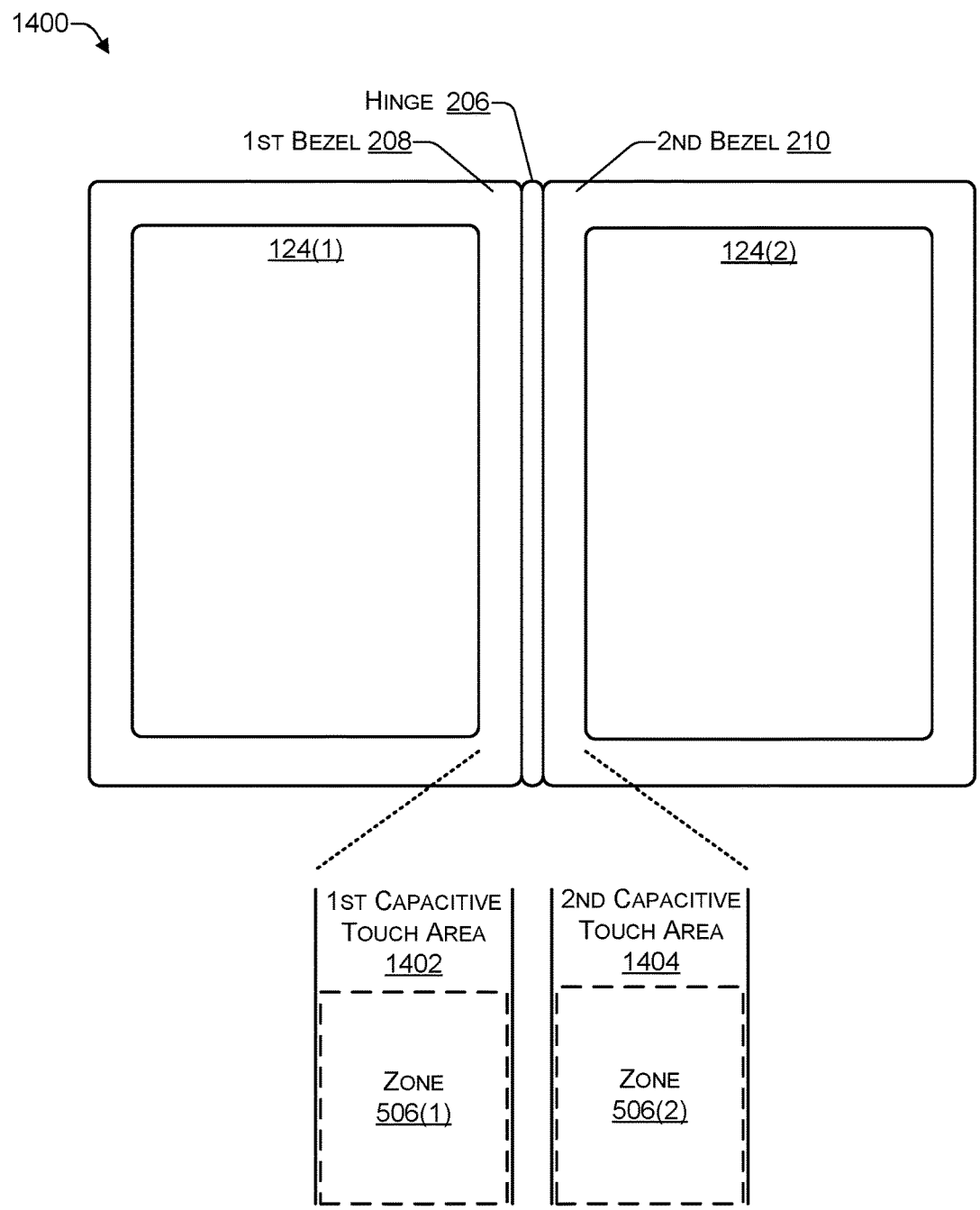
FIG. 14 is a block diagram illustrating a bezel of a display device that includes a capacitive touch area according to some embodiments.

FIG. 14 is a block diagram illustrating a bezel of a display device that includes a capacitive touch area according to some embodiments. In some cases, the bezels 208, 210 of the computing device 102 may include a capacitive touch area. For example, the first bezel 208 may include a first capacitive touch area 1402 and the second bezel 210 may include a second capacitive touch area 1404. The capacitive touch areas 1402, 1404 may be used for the zones 506(1), 506(2), respectively, as described in FIG. 9 and by the flowchart in FIG. 13 to create a zone in which to aggregate objects (e.g., data and content) to enable the objects to be moved from one display device to another display device. The areas 1402, 1404 may include areas of the display devices 124(1), 124(2) on sides of the bezels 208, 210, that are adjacent to the hinge 206 and that expand the active touch zone. Interactions in the designated touch-bezel areas 1402, 1404 may initiate actions and gestures as described herein.

Figure 15:
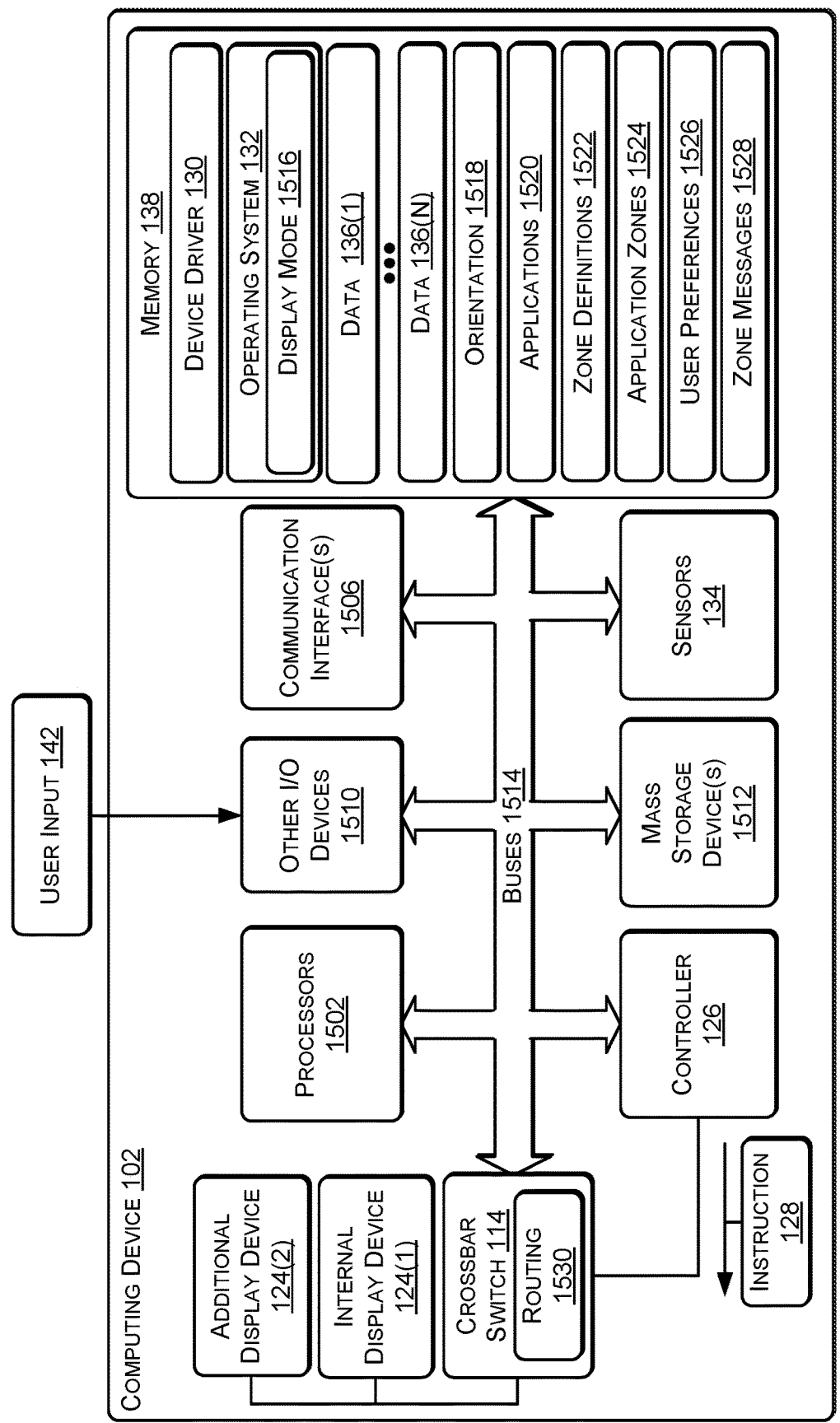
FIG. 15 illustrates an example configuration of a computing device that can be used to implement the systems and techniques described herein.

FIG. 15 illustrates an example configuration of the computing device 102 of FIG. 1 that can be used to implement the systems and techniques described herein. The computing device 102 may include one or more processors 1502 (e.g., the CPU 106 and the GPU 104 of FIG. 1), the memory 138, communication interfaces 1506, the display devices 124(1) and 124(2), other input/output (I/O) devices 1510, and one or more mass storage devices 1512, configured to communicate with each other, such as via one or more system buses 1514 or other suitable connection. While a single bus is illustrated for ease of understanding, it should be understood that the system buses 1514 may include multiple buses, such as memory device buses, storage device buses, power buses, video signal buses, and the like.

The processors 1502 are one or more hardware devices that may include a single processing unit or a number of processing units, all of which may include single or multiple computing units or multiple cores. The processors 1502 may include an integrated GPU or the GPU a separate processor device. The processors 1502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1502 may be configured to fetch and execute computer-readable instructions stored in the memory 138, mass storage devices 1512, or other computer-readable media.

Memory 138 and mass storage devices 1512 are examples of non-transitory computer media (e.g., memory storage devices) for storing instructions that can be executed by the processors 1502 to perform the various functions described herein. For example, memory 138 may include both volatile memory and non-volatile memory (e.g., RAM, ROM, or the like) devices. Further, mass storage devices 1512 may include hard disk drives, solid-state drives, removable media, including external and removable drives, memory cards, flash memory, floppy disks, optical disks (e.g., CD, DVD), a storage array, a network attached storage, a storage area network, or the like. Both memory 138 and mass storage devices 1512 may be collectively referred to as a memory or computer storage media herein, and may be a media capable of storing computer-readable, processor-executable program instructions as computer program code that can be executed by the processor 1502 as a particular machine configured for carrying out the operations and functions described in the implementations herein.

The computing device 102 may also include one or more communication interfaces 1506 for exchanging data via a network. The communication interfaces 1506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1506 can also provide communication with external storage (not shown), such as in a storage array, network attached storage, storage area network, or the like. The display devices 124(1) and 124(2) may be connected to each other using a hinge (e.g., the hinge 206 of FIG. 2) that enables each display device to rotate relative to the other display device. The display devices 124 may be used for displaying information and images to users. Other I/O devices 1510 may be devices that receive various inputs from a user and provide various outputs to the user, and may include a keyboard, a remote controller, a mouse, a printer, audio input/output devices, and so forth.

The computer storage media, such as memory 138 and mass storage devices 1512, may be used to store software and data. For example, the computer storage media may be used to store the operating system 132, the device driver 130, and the data 136(1) to 136(N). The operating system 132 may be set to a particular display mode 1516. For example, the operating system 132 may have a default display mode and a user may set the display mode 1516 to something different than the default display mode. The computer storage media may store an orientation 1518, one or more software applications 1520, one or more zone definitions 1522, application zones 1524, user preferences 1526, and zone messages 1528. The zone definitions 1522 may be include definitions of zones that may be created (e.g., by the operating system 132). The zone definitions 1522 may specify a length of each zone, a width of each zone, a location (e.g., which display device, where on the display device, etc.) of the zone, the conditions under which (e.g., a proximity of object to a zone and the like) a message associated with the zone is displayed, and other zone-related information. The application zones 1524 may include zone definitions associated with specific applications. For example, a particular application, when launched, may create a specific set of zones to perform a specific set of actions. The user preferences 1526 may include user defined zones that may override the default zones of the operating system or application specified zones. The zone messages 1528 may include various messages displayed when an object is near (or over) a particular zone.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
 a first display device;
 a second display device;
 one or more hinges coupling the first display device to the second display device, wherein the one or more hinges enable the first display device to be placed at an angle between 0 degrees and at least 180 degrees relative to the second display device;
 one or more processors;
 one or more non-transitory computer readable media storing instructions executable by the one or more processors to perform operations comprising:
  determining, based on the angle, that the first display device and the second display device are both viewable;
  defining a zone on the first display device;
  receiving selection input selecting an object being displayed on the first display device;
  receiving directional input to move the object on the first display device;
  determining that at least a portion of the object is within a boundary of the zone;

automatically displaying the object on the second display device of the computing device; and automatically stopping displaying the object on the first display device of the computing device.

2. The computing device of claim 1, wherein:

an orientation of the computing device comprises one of a horizontal orientation or a vertical orientation.

3. The computing device of claim 1, the operations further comprising:

creating a second zone on the first display device;

receiving second selection input selecting a second object being displayed on the first display device;

receiving second directional input to move the second object on the first display device;

determining that at least a portion of the second object is within the second zone; and causing the second object to be displayed spanning both the first display device and the second display device without maximizing a size of the second object.

4. The computing device of claim 1, the operations further comprising:

displaying a first portion of a second object within a second zone on the first display device;

displaying a second portion of the second object within a third zone on the second display device;

receiving second selection input selecting the second portion of the second object within the third zone on the second display device;

receiving second directional input to move the second object;

displaying the second object, outside the third zone, on the second display device; and stopping displaying the second object on the first display device.

5. The computing device of claim 1, the operations further comprising:

creating a second zone on the first display device;

receiving second selection input selecting a second object being displayed on the first display device;

receiving second directional input to move the second object on the first display device;

determining that at least a portion of the second object is within the second zone; and displaying the second object maximized and spanning both the first display device and the second display device.

6. The computing device of claim 1, wherein defining the zone on the first display device comprises:

creating the zone to have a pre-specified length and a pre-specified width; and positioning the zone at a pre-specified location on the first display device.

7. One or more non-transitory computer-readable media storing instructions that are executable by one or more processors to perform operations comprising:

determining that a computing device comprising a first display device coupled to a second display device by one or more hinges has an orientation in which the first display device and the second display device of the computing device are both viewable, wherein the one or more hinges enable the first display device to be placed at an angle between 0 degrees and at least 180 degrees relative to the second display device;

defining a zone on the first display device;

receiving selection input selecting an object being displayed on the first display device;

receiving directional input to move the object on the first display device;

determining that at least a portion of the object is within a boundary of the zone;

automatically displaying the object on the second display device of the computing device; and automatically stopping displaying the object on the first display device of the computing device.

8. The one or more non-transitory computer-readable media of claim 7, wherein the orientation comprises one of a horizontal orientation or a vertical orientation.

9. The one or more non-transitory computer-readable media of claim 7, the operations further comprising:

creating a second zone on the first display device;

receiving second selection input selecting a second object being displayed on the first display device;

receiving second directional input to move the second object on the first display device;

determining that at least a portion of the second object is within the second zone; and causing the second object to be displayed spanning both the first display device and the second display device without maximizing a size of the second object.

10. The one or more non-transitory computer-readable media of claim 7, the operations further comprising:

displaying a first portion of a second object within a second zone on the first display device; and displaying a second portion of the second object within a third zone on the second display device;

receiving second selection input selecting the second portion of the second object within the third zone on the second display device;

receiving second directional input to move the second object;

displaying the second object, outside the third zone, on the second display device; and stopping displaying the second object on the first display device.

11. The one or more non-transitory computer-readable media of claim 7, the operations further comprising:

creating a second zone on the first display device;

receiving second selection input selecting a second object being displayed on the first display device;

receiving second directional input to move the second object on the first display device;

determining that at least a portion of the second object is within the second zone; and displaying the second object maximized and spanning both the first display device and the second display device.

12. The one or more non-transitory computer-readable media of claim 7, the operations further comprising:

determining that a location of the object is within a predetermined distance from a boundary of the zone; and displaying for a predetermined period of time, a message indicating an action associated with the zone.

13. The one or more non-transitory computer-readable media of claim 7, wherein defining the zone on the first display device comprises:

receiving user input comprising a length of the zone, a width of the zone, and a location of the zone;

creating the zone to have the length and the width; and positioning the zone at the location on the first display device.

14. A method comprising:
  determining, by a computing device comprising a first display device coupled to a second display device by one or more hinges, that the computing device has an orientation in which both the first display device and the second display device are viewable, wherein the one or more hinges enable the first display device to be placed at an angle between 0 degrees and at least 180 degrees relative to the second display device;
  defining, by the computing device, a zone on the first display device;
  receiving, by the computing device, selection input selecting an object being displayed on the first display device;
  receiving, by the computing device, directional input to move the object on the first display device;
  determining, by the computing device, that at least a portion of the object is within a boundary of the zone;
  automatically displaying the object on the second display device of the computing device; and
  automatically stopping displaying the object on the first display device of the computing device.

15. The method of claim 14, wherein the orientation comprises one of a horizontal orientation or a vertical orientation.

16. The method of claim 14, further comprising:
  creating a second zone on the first display device;
  receiving second selection input selecting a second object being displayed on the first display device;
  receiving second directional input to move the second object on the first display device;
  determining that at least a portion of the second object is within the second zone; and
  causing the second object to be displayed spanning both the first display device and the second display device without maximizing a size of the second object.

17. The method of claim 14, further comprising:
  displaying a first portion of a second object within a second zone on the first display device;
  displaying a second portion of the second object within a third zone on the second display device;
  receiving second selection input selecting the second portion of the second object within the third zone on the second display device;
  receiving second directional input to move the second object;
  displaying the second object, outside the third zone, on the second display device; and
  stopping displaying the second object on the first display device.

18. The method of claim 14, further comprising:
  creating a second zone on the first display device;
  receiving second selection input selecting a second object being displayed on the first display device;
  receiving second directional input to move the second object on the first display device;
  determining that at least a portion of the second object is within the second zone; and
  displaying the second object maximized and spanning both the first display device and the second display device.

19. The method of claim 14, further comprising:
  determining, by the computing device, that a location of the object is within a predetermined distance from a boundary of the zone; and
  displaying, by the computing device, for a predetermined period of time, a message indicating an action associated with the zone.

20. The method of claim 14, wherein defining the zone on the first display device comprises:
  creating the zone to have a pre-specified length and a pre-specified width; and
  positioning the zone at a pre-specified location on the first display device.

* * * * *